US010657097B1

(12) United States Patent
Paterra et al.

(10) Patent No.: US 10,657,097 B1
(45) Date of Patent: May 19, 2020

(54) DATA PAYLOAD AGGREGATION FOR DATA STORAGE SYSTEMS

(71) Applicant: Amazon Technologies, Inc., Seattle, WA (US)

(72) Inventors: Frank Charles Paterra, Kirkland, WA (US); Eric Neilsen, Lynnwood, WA (US)

(73) Assignee: Amazon Technologies, Inc., Seattle, WA (US)

(*) Notice: Subject to any disclaimer, the term of this patent is extended or adjusted under 35 U.S.C. 154(b) by 516 days.

(21) Appl. No.: 15/279,341

(22) Filed: Sep. 28, 2016

(51) Int. Cl.
G06F 17/30 (2006.01)
G06F 16/13 (2019.01)
G06F 16/174 (2019.01)

(52) U.S. Cl.
CPC .......... G06F 16/13 (2019.01); G06F 16/1744 (2019.01)

(58) Field of Classification Search
CPC ..................... G06F 16/13; G06F 16/1744
See application file for complete search history.

(56) References Cited

U.S. PATENT DOCUMENTS

| | | |
|---|---|---|
| 5,729,671 A | 3/1998 | Peterson et al. |
| 6,249,836 B1 | 6/2001 | Downs et al. |
| 6,427,185 B1 | 7/2002 | Ryals et al. |
| 6,665,565 B1 | 12/2003 | Stomberg et al. |
| 6,779,150 B1 | 8/2004 | Walton et al. |
| 6,862,362 B2 | 3/2005 | Gangadhar |
| 6,922,700 B1 | 7/2005 | Aggarwal et al. |
| 7,117,294 B1 | 10/2006 | Mi et al. |
| 7,127,477 B2* | 10/2006 | Duncombe ........... G06F 21/606 709/238 |
| 7,142,150 B2 | 11/2006 | Thackray |
| 7,380,129 B2 | 5/2008 | Keohane et al. |
| 7,490,013 B2 | 2/2009 | Wells |
| 7,693,813 B1 | 4/2010 | Cao et al. |
| 7,783,600 B1 | 8/2010 | Spertus et al. |
| 7,805,706 B1 | 9/2010 | Ly et al. |

(Continued)

FOREIGN PATENT DOCUMENTS

| | | |
|---|---|---|
| JP | 2004531923 A | 10/2004 |
| KR | 20130107383 A | 10/2013 |

(Continued)

OTHER PUBLICATIONS

Amazon, "Batch Cloud Data Transfer Services—Amazon Import/Export Snowball Appliance," Jun. 17, 2016, retrieved Oct. 8, 2016, https://web.archive.org/web/20160617044144/http://aws.amazon.com/importexport/, 6 pages.

(Continued)

Primary Examiner — Jared M Bibbee
(74) Attorney, Agent, or Firm — Davis Wright Tremaine LLP

(57) ABSTRACT

A data storage system implements aggregation, bifurcation, and/or reduction techniques to improve the efficiency of processing data storage requests. Data storage requests and/or their associated payloads may be aggregated based on one or more parameters. Data to be stored and the associated commands may be separated so as to optimize a system's throughput and latency for each. Furthermore, extraneous commands and requests may be reduced or eliminated based on heuristics associated with the requests and the data.

20 Claims, 19 Drawing Sheets

(56) References Cited

U.S. PATENT DOCUMENTS

| | | | |
|---|---|---|---|
| 7,809,848 B1 | 10/2010 | McDougall et al. |
| 7,873,666 B2 | 1/2011 | Sauermann |
| 7,930,611 B2 | 4/2011 | Huang et al. |
| 8,239,402 B1 | 8/2012 | Kumaresan et al. |
| 8,261,033 B1 | 9/2012 | Slik et al. |
| 8,386,841 B1 | 2/2013 | Renade |
| 8,413,187 B1 | 4/2013 | Del Sesto et al. |
| 8,479,078 B2 | 7/2013 | Resch et al. |
| 8,504,518 B1 | 8/2013 | Ghemawat et al. |
| 8,504,535 B1 | 8/2013 | He et al. |
| 8,612,219 B2 | 12/2013 | Tsuchinaga et al. |
| 8,621,069 B1 | 12/2013 | Tompkins |
| 8,706,980 B2 | 4/2014 | Dhuse et al. |
| 8,769,049 B2 | 7/2014 | Murphy et al. |
| 8,788,855 B2 | 7/2014 | Cong et al. |
| 8,806,296 B1 | 8/2014 | Lazier |
| 8,850,288 B1 | 9/2014 | Lazier et al. |
| 8,868,825 B1 | 10/2014 | Hayes et al. |
| 8,869,001 B1 | 10/2014 | Lazier |
| 8,935,221 B1 | 1/2015 | Lazier et al. |
| 8,935,761 B2 | 1/2015 | Gladwin et al. |
| 8,938,591 B2 | 1/2015 | Mark et al. |
| 8,959,067 B1 | 2/2015 | Patiejunas et al. |
| 8,972,465 B1 | 3/2015 | Faibish et al. |
| 8,984,363 B1 | 3/2015 | Juels et al. |
| 8,984,384 B1 | 3/2015 | Juels et al. |
| 9,002,805 B1 | 4/2015 | Barber et al. |
| 9,003,144 B1 | 4/2015 | Hayes et al. |
| 9,009,491 B2 | 4/2015 | Resch |
| 9,021,297 B1 | 4/2015 | Hayes et al. |
| 9,047,214 B1 | 6/2015 | Northcott |
| 9,052,942 B1 | 6/2015 | Barber et al. |
| 9,092,441 B1 | 7/2015 | Patiejunas et al. |
| 9,110,797 B1 | 8/2015 | Lazier |
| 9,165,002 B1 | 10/2015 | Lazier |
| 9,208,018 B1 | 12/2015 | Northcott et al. |
| 9,213,485 B1 | 12/2015 | Hayes et al. |
| 9,213,709 B2 | 12/2015 | Patiejunas et al. |
| 9,218,244 B1 | 12/2015 | Hayes et al. |
| 9,223,789 B1 | 12/2015 | Seigle et al. |
| 9,225,675 B2 | 12/2015 | Patiejunas et al. |
| 9,244,761 B2 | 1/2016 | Yekhanin et al. |
| 9,250,811 B1 | 2/2016 | Patiejunas |
| 9,251,097 B1 | 2/2016 | Kumar et al. |
| 9,253,810 B2 | 2/2016 | Kaczmarska-Wojtania et al. |
| 9,256,467 B1 | 2/2016 | Singh et al. |
| 9,256,761 B1 | 2/2016 | Sahu et al. |
| 9,270,683 B2 | 2/2016 | Coughlin et al. |
| 9,271,052 B2 | 2/2016 | Holden |
| 9,281,845 B1 | 3/2016 | Lazier |
| 9,298,760 B1 | 3/2016 | Li et al. |
| 9,354,683 B2 | 5/2016 | Patiejunas et al. |
| 9,378,084 B2 | 6/2016 | Calder et al. |
| 9,405,333 B1 | 8/2016 | Pine |
| 9,448,614 B2 | 9/2016 | Slik |
| 9,449,346 B1 | 9/2016 | Hockey et al. |
| 9,459,959 B1 | 10/2016 | Franklin et al. |
| 9,461,876 B2 | 10/2016 | Van Dusen et al. |
| 9,483,513 B2 | 11/2016 | Heidel et al. |
| 9,495,249 B1 | 11/2016 | Franklin et al. |
| 9,495,255 B2 | 11/2016 | Davis et al. |
| 9,513,820 B1 | 12/2016 | Shalev |
| 9,563,551 B2 | 2/2017 | Cheng |
| 9,563,681 B1 | 2/2017 | Patiejunas et al. |
| 9,626,253 B1 | 4/2017 | Zhang et al. |
| 9,672,110 B1 | 6/2017 | Patel |
| 9,753,669 B2 | 9/2017 | Ben-Shaul et al. |
| 9,785,495 B1 | 10/2017 | Lazier et al. |
| 9,792,179 B1 | 10/2017 | Lazier |
| 9,825,625 B2 | 11/2017 | Thalheim |
| 9,825,652 B1 | 11/2017 | Lazier |
| 9,838,041 B1 | 12/2017 | Lazier |
| 9,838,042 B1 | 12/2017 | Lazier |
| 9,853,662 B1 | 12/2017 | Lazier et al. |
| 9,866,242 B1 | 1/2018 | Lazier |
| 9,904,589 B1 | 2/2018 | Donlan et al. |
| 9,923,966 B1 | 3/2018 | Franklin et al. |
| 9,934,389 B2 | 4/2018 | Paterra et al. |
| 9,998,539 B1 | 6/2018 | Brock et al. |
| 10,097,356 B2 | 10/2018 | Zinder |
| 2003/0032417 A1 | 2/2003 | Minear et al. |
| 2003/0172325 A1 | 9/2003 | Wyatt et al. |
| 2004/0040025 A1 | 2/2004 | Lehtinen |
| 2004/0054997 A1 | 3/2004 | Katragadda et al. |
| 2004/0128470 A1 | 7/2004 | Hetzler et al. |
| 2004/0230764 A1 | 11/2004 | Merchant et al. |
| 2004/0268037 A1 | 12/2004 | Buchanan et al. |
| 2006/0004675 A1 | 1/2006 | Bennett et al. |
| 2006/0020645 A1* | 1/2006 | Hasegawa ............... G06F 16/10 |
| 2006/0064709 A1 | 3/2006 | Throckmorton et al. |
| 2006/0074954 A1 | 4/2006 | Hartline et al. |
| 2006/0080574 A1 | 4/2006 | Saito et al. |
| 2006/0117217 A1 | 6/2006 | Chien et al. |
| 2006/0136928 A1 | 6/2006 | Crawford et al. |
| 2006/0168575 A1 | 7/2006 | Bhatt et al. |
| 2006/0168581 A1 | 7/2006 | Goger et al. |
| 2007/0118657 A1 | 5/2007 | Kreitzer et al. |
| 2007/0124020 A1 | 5/2007 | Staples |
| 2007/0156842 A1 | 7/2007 | Vermeulen et al. |
| 2007/0180294 A1 | 8/2007 | Kameyama et al. |
| 2007/0245331 A1 | 10/2007 | Daynes et al. |
| 2008/0033914 A1 | 2/2008 | Cherniack et al. |
| 2008/0082575 A1 | 4/2008 | Peter et al. |
| 2008/0101598 A1 | 5/2008 | Dillaway |
| 2008/0189705 A1 | 8/2008 | Weinert et al. |
| 2009/0025092 A1 | 1/2009 | Smith et al. |
| 2009/0094250 A1 | 4/2009 | Dhuse et al. |
| 2009/0210546 A1 | 8/2009 | Gindentuller et al. |
| 2009/0290580 A1* | 11/2009 | Wood ................. H04L 63/0428 370/389 |
| 2009/0319078 A1 | 12/2009 | Jackson |
| 2010/0131792 A1 | 5/2010 | Herrod |
| 2010/0138764 A1 | 6/2010 | Hatambeiki et al. |
| 2010/0153941 A1 | 6/2010 | Borissov et al. |
| 2010/0228708 A1 | 9/2010 | Lehr et al. |
| 2010/0251339 A1 | 9/2010 | McAlister |
| 2010/0287137 A1 | 11/2010 | Lyakhovitskiy |
| 2010/0306267 A1 | 12/2010 | Zamkoff et al. |
| 2010/0318999 A1 | 12/2010 | Zhao et al. |
| 2010/0328528 A1 | 12/2010 | Eggert |
| 2010/0332751 A1 | 12/2010 | Quigley et al. |
| 2011/0022574 A1 | 1/2011 | Hansen |
| 2011/0022633 A1 | 1/2011 | Bemosky et al. |
| 2011/0055661 A1 | 3/2011 | Grube et al. |
| 2011/0078277 A1 | 3/2011 | Baptist |
| 2011/0202929 A1* | 8/2011 | Schleimer ......... G06F 16/24549 718/106 |
| 2011/0225209 A1 | 9/2011 | Volvovski et al. |
| 2011/0225426 A1 | 9/2011 | Agarwal et al. |
| 2011/0264717 A1 | 10/2011 | Grube et al. |
| 2011/0289263 A1 | 11/2011 | McWilliams et al. |
| 2011/0296195 A1 | 12/2011 | Nakagawa et al. |
| 2011/0296440 A1 | 12/2011 | Laurich et al. |
| 2012/0011398 A1 | 1/2012 | Eckhardt et al. |
| 2012/0017096 A1 | 1/2012 | Snider |
| 2012/0079189 A1 | 3/2012 | Colgrove et al. |
| 2012/0079190 A1 | 3/2012 | Colgrove et al. |
| 2012/0110150 A1 | 5/2012 | Kosuru et al. |
| 2012/0185437 A1 | 7/2012 | Pavlov et al. |
| 2012/0243687 A1 | 9/2012 | Li et al. |
| 2012/0254089 A1 | 10/2012 | Alba et al. |
| 2012/0254175 A1 | 10/2012 | Horowitz et al. |
| 2012/0254690 A1 | 10/2012 | Resch et al. |
| 2012/0284369 A1 | 11/2012 | Fishgait et al. |
| 2012/0290539 A1 | 11/2012 | Bryant et al. |
| 2012/0297311 A1 | 11/2012 | Duggal |
| 2012/0310878 A1 | 12/2012 | Vuksan et al. |
| 2012/0322422 A1 | 12/2012 | Frecks, Jr. et al. |
| 2012/0331088 A1 | 12/2012 | O'Hare et al. |
| 2013/0007511 A1 | 1/2013 | Gaertner et al. |
| 2013/0029641 A1 | 1/2013 | Hickie |
| 2013/0073600 A1 | 3/2013 | Jenkins et al. |
| 2013/0109371 A1 | 5/2013 | Brogan et al. |
| 2013/0151653 A1 | 6/2013 | Sawicki et al. |

(56) References Cited

U.S. PATENT DOCUMENTS

| | | |
|---|---|---|
| 2013/0191527 A1 | 7/2013 | Ashok et al. |
| 2013/0238702 A1* | 9/2013 | Sheth .................. H04L 67/38 709/204 |
| 2013/0238932 A1* | 9/2013 | Resch .................. G06F 21/64 714/20 |
| 2013/0254904 A1 | 9/2013 | Fukuda |
| 2013/0275776 A1 | 10/2013 | Baptist et al. |
| 2013/0297964 A1 | 11/2013 | Hegdal et al. |
| 2013/0304711 A1 | 11/2013 | Resch |
| 2013/0326583 A1 | 12/2013 | Freihold et al. |
| 2014/0006458 A1 | 1/2014 | Hsieh et al. |
| 2014/0006850 A1 | 1/2014 | Aliev et al. |
| 2014/0007214 A1 | 1/2014 | Qureshi et al. |
| 2014/0019764 A1 | 1/2014 | Gopal et al. |
| 2014/0046906 A1 | 2/2014 | Patiejunas et al. |
| 2014/0046908 A1 | 2/2014 | Patiejunas et al. |
| 2014/0046909 A1 | 2/2014 | Patiejunas et al. |
| 2014/0047040 A1 | 2/2014 | Patiejunas et al. |
| 2014/0047261 A1 | 2/2014 | Patiejunas et al. |
| 2014/0108421 A1 | 4/2014 | Isaacson et al. |
| 2014/0122572 A1 | 5/2014 | Finkelstein et al. |
| 2014/0149794 A1 | 5/2014 | Shetty et al. |
| 2014/0149986 A1 | 5/2014 | S M et al. |
| 2014/0153481 A1 | 6/2014 | Draznin et al. |
| 2014/0156632 A1 | 6/2014 | Yu et al. |
| 2014/0173058 A1 | 6/2014 | Twitchell, Jr. |
| 2014/0189388 A1 | 7/2014 | Lynar et al. |
| 2014/0201541 A1 | 7/2014 | Paul et al. |
| 2014/0207680 A1 | 7/2014 | Rephlo |
| 2014/0298134 A1 | 10/2014 | Grube et al. |
| 2014/0304356 A1 | 10/2014 | Allen, Sr. et al. |
| 2014/0310571 A1 | 10/2014 | Fetterly et al. |
| 2014/0344446 A1 | 11/2014 | Rjeili et al. |
| 2014/0351632 A1 | 11/2014 | Grube et al. |
| 2014/0358925 A1 | 12/2014 | Jakobowski |
| 2014/0359144 A1 | 12/2014 | Kruse et al. |
| 2014/0372383 A1 | 12/2014 | Sipek |
| 2014/0380126 A1 | 12/2014 | Yekhanin et al. |
| 2015/0058473 A1 | 2/2015 | Grande |
| 2015/0143021 A1 | 5/2015 | Bruso et al. |
| 2015/0149870 A1 | 5/2015 | Kozat |
| 2015/0154111 A1 | 6/2015 | D'Abreu et al. |
| 2015/0169716 A1 | 6/2015 | Franklin et al. |
| 2015/0175333 A1 | 6/2015 | Richardson et al. |
| 2015/0253995 A1 | 9/2015 | Zhao |
| 2015/0256423 A1 | 9/2015 | Steams |
| 2015/0278324 A1 | 10/2015 | Wong et al. |
| 2015/0324745 A1 | 11/2015 | Goodall et al. |
| 2015/0331635 A1 | 11/2015 | Ben-Shaul et al. |
| 2015/0350316 A1 | 12/2015 | Calder et al. |
| 2015/0355974 A1 | 12/2015 | Hayes et al. |
| 2015/0356005 A1 | 12/2015 | Hayes et al. |
| 2016/0011816 A1 | 1/2016 | Aizman |
| 2016/0034295 A1 | 2/2016 | Cochran |
| 2016/0036665 A1* | 2/2016 | Borah .................. H04L 43/065 709/221 |
| 2016/0041868 A1 | 2/2016 | Davis et al. |
| 2016/0041869 A1 | 2/2016 | Davis et al. |
| 2016/0041878 A1 | 2/2016 | Davis et al. |
| 2016/0041887 A1 | 2/2016 | Davis et al. |
| 2016/0048399 A1 | 2/2016 | Shaw |
| 2016/0062623 A1 | 3/2016 | Howard et al. |
| 2016/0085797 A1 | 3/2016 | Patiejunas et al. |
| 2016/0092248 A1 | 3/2016 | Shani et al. |
| 2016/0094753 A1 | 3/2016 | Miyazawa |
| 2016/0179824 A1 | 6/2016 | Donlan et al. |
| 2016/0216891 A1 | 7/2016 | Bester et al. |
| 2016/0216991 A1 | 7/2016 | Ansari et al. |
| 2016/0335310 A1 | 11/2016 | Lahiri et al. |
| 2017/0024281 A1 | 1/2017 | Franklin et al. |
| 2017/0041441 A1* | 2/2017 | Barber .................. G06F 16/258 |
| 2017/0060687 A1 | 3/2017 | Franklin et al. |
| 2017/0180346 A1 | 6/2017 | Suarez et al. |
| 2017/0222814 A1 | 8/2017 | Oberhauser et al. |
| 2017/0235848 A1 | 8/2017 | Van Dusen et al. |
| 2017/0250801 A1 | 8/2017 | Chen et al. |
| 2017/0262697 A1 | 9/2017 | Kaps et al. |
| 2017/0293669 A1 | 10/2017 | Madhavan et al. |
| 2017/0295023 A1 | 10/2017 | Madhavan et al. |
| 2017/0331896 A1 | 11/2017 | Holloway et al. |
| 2018/0082256 A1 | 3/2018 | Tummuru et al. |

FOREIGN PATENT DOCUMENTS

| | | |
|---|---|---|
| WO | 02071382 A1 | 9/2002 |
| WO | 2014047073 A1 | 3/2014 |

OTHER PUBLICATIONS

Barr, "AWS Import/Export: Ship Us That Disk!," Amazon Web Services Blog, May 21, 2009, retrieved Mar. 14, 2017, https://aws.amazon.com/blogs/aws/send-us-that-data/, 7 pages.

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

International Search Report and Written Opinion dated Aug. 25, 2016, International Patent Application No. PCT/US2016/040510, filed Jun. 30, 2016.

Storer et al., "POTSHARDS—A Secure, Recoverable, Long-Term Archival Storage System," ACM Transactions on Storage, Published Jun. 2009, vol. 5, No. 2, Article 5, pp. 5:1 to 5:35.

Zyga, "Light-up Cereal Boxes Powered by Shelvers on Display at CES," Phys.org, Jan. 11, 2011, retrieved May 19, 2015, http://phys.org/news/201101lightupcerealpoweredshelvesces.html, 13 pages.

"New! xTablet T7000 Rugged Mini Tablet PC," MobileDemand, copyright 2012 [web archive Mar. 12, 2012], https://web.archive.org/web/20120312010139/http://www.ruggedtabletpc.com/products/xtablet-t7000-rugged-mini-tablet-pc/, 3 pages.

Binns, "Elasticsearch Failure and Recovery," TechRabbit, Oct. 31, 2014 [retrieved Nov. 17, 2017], http://tech.taskrabbit.com/blog/2014/10/31/es-failure-recovery/, four pages.

European Office Action dated Nov. 6, 2018, Patent Application No. 16739357.8-1222, published May 9, 2018, 7 pages.

Franco, "Understanding Bitcoin: Cryptography, Engineering and Economics," Wiley, Nov. 24, 2014, 167 pages.

He et al., "Elastic Application Container: A Lightweight Approach for Cloud Resource Provisioning," 26th IEEE International Conference on Advanced Information Networking and Applications, Mar. 26, 2012, pp. 15-22.

IEEE 100, "The Authoritative Dictionary of IEEE Standards Terms", Seventh Edition, IEEE Standards Information Network, IEEE Press, Dec. 2000, 5 pages (pertinent pp. 1, 2, 155, 207, 1112).

International Organization for Standardization/ International Electrotechnical Commission, "Information technology—Trusted Platform Module—Part 1: Overview," International Standard, ISO/IEC 11889-1(E), May 15, 2009, 20 pages.

International Organization for Standardization/International Electrotechnical Commission, "Information technology—Trusted Platform Module—Part 2: Design principles," International Standard, ISO/IEC 11889-2(E), May 15, 2009, 152 pages.

International Organization for Standardization/International Electrotechnical Commission, "Information technology—Trusted Platform Module—Part 3: Structures," International Standard, ISO/IEC 11889-3:2009(E), May 15, 2009, 204 pages.

International Organization for Standardization/International Electrotechnical Commission, "Information technology—Trusted Platform Module—Part 4: Commands," International Standard, ISO/IEC 11889-4:2009(E), May 15, 2009, 254 pages.

International Search Report and Written Opinion in International Patent Application No. PCT/US2015/050513, dated Feb. 16, 2016, 22 pages.

International Search Report and Written Opinion dated Feb. 4, 2016, International Patent Application No. PCT/US2015/059983, 12 pages.

International Search Report and Written Opinion dated Nov. 22, 2017, International Patent Application No. PCT/US2017/054319, filed Sep. 29, 2017, 14 pages.

(56) References Cited

OTHER PUBLICATIONS

Kim, "Flow Sharding Works," Medium, Dec. 5, 2014 [retrieved Nov. 17, 2017], https://medium.com/@jeeyoungk/how-sharding-works-b4dec46b3f6, 12 pages.

MacCarthaigh, "Shuffle Sharding: Massive and Magical Fault Isolation," AWS Architecture Blog, Apr. 14, 2014 [retrieved Nov. 27, 2017], https://aws.amazon.com/blogs/architecture/shuffle-sharding-massive-and-magical-fault-isolation/, six pages.

PC Plus, "How to turn an old netbook into a NAS drive," TechRadar, Mar. 1, 2010 [retreived Feb. 5, 2019], https://www.techradar.com/news/networking/routers-storage/how-to-turn-an-old-netbook-into-a-nas-drive-670757, 12 pages.

Pikkarainen et al., "The impact of agile practices on communication in software development," Empirical Software Engineering 13(3):303-37, Jun. 1, 2008.

Ramamritham, "Allocation and scheduling of precedence-related periodic tasks," IEEE Transactions on Parallel and Distributed Systems 6(4):412-420, Apr. 1995.

Soltesz et al., "Container-based operating system virtualization: a scalable, high-performance alternative to hypervisors," ACM SIGOPS Operating Systems Review 41(3):275-287, Mar. 2007.

Swan, "Blockchain: Blueprint for a New Economy," O'Reilly Media, Inc., Jan. 22, 2015, 144 pages.

Thiele et al., "Embedded Software in Network Processors—Models and Algorithms," Lecture Notes in Computer Science 2211:416-34, Oct. 8, 2001.

Third-Party Submission Under 37 CFR 1.290 dated Apr. 24, 2018, U.S. Appl. No. 15/283,017, filed Sep. 30, 2016, 10 pages.

Trusted Computing Group, "TPM Main, Part 1 Design Principles," Specification Version 1.2, Level 2 Revision 103, Jul. 9, 2007, 182 pages.

Trusted Computing Group, "TPM Main, Part 1 Design Principles," Specification Version 1.2, Revision 116, Mar. 1, 2011, 184 pages.

Trusted Computing Group, "TPM Main, Part 2 TPM Structures," Specification Version 1.2, Level 2 Revision 103, Jul. 9, 2007, 198 pages.

Trusted Computing Group, "TPM Main, Part 2 TPM Structures," Specification Version 1.2, Revision 116, Mar. 1, 2011, 201 pages.

Trusted Computing Group, "TPM Main, Part 3 Commands," Specification Version 1.2, Level 2 Revision 103, Jul. 9, 2007, 330 pages.

Trusted Computing Group, "TPM Main, Part 3 Commands," Specification Version 1.2, Revision 116, Mar. 1, 2011, 339 pages.

Van et al., "SLA-aware Virtual Resource Management for Cloud Infrastructures," IEEE Ninth International Conference on Computer and Information Technology, Oct. 11, 2009, pp. 357-362.

Wikipedia, "IEEE 802.11," Wikipedia, the Free Encyclopedia, page last modified Feb. 7, 2017, retrieved Feb. 13, 2017, https://en.wikipedia.org/wiki/IEEE_802.11, 9 pages.

Wikipedia, "IEEE 802.16," Wikipedia, the Free Encyclopedia, page last modified Nov. 21, 2016, retrieved Feb. 13, 2017, https://en.wikipedia.org/wiki/IEEE_802.16, 8 pages.

Wikipedia, "IEEE 802.21," Wikipedia, the Free Encyclopedia, page last modified Aug. 4, 2016, retrieved Feb. 13, 2017, https://en.wikipedia.org/wiki/IEEE_802.21, 3 pages.

Xavier et al., "Performance Evaluation of Container-based Virtualization for High Performance Computing Environments," Parallel, Distributed, and Network-Based Processing (PDP), 2013 21st Euromicro International Conference, Feb. 2013, pp. 233-240.

Zhao et al., "Experimental Study of Virtual Machine Migration in Support of Reservation of Cluster Resources," Proceedings of the 2nd International Workshop on Virtualization Technology in Distributed Computing, Nov. 2007, pp. 1-8.

Zheng et al., "Grid-partition index: a hybrid method for nearest-neighbor queries in wireless location-based services," The VLDB Journal—The International Journal on Very Large Data Bases 15(1):21-39, online publication Jul. 22, 2005, print publication Jan. 1, 2006.

Japanese Office Action dated Mar. 5, 2019, Patent Application No. 2017-566702, filed Mar. 22, 2017, 8 pages.

\* cited by examiner

DATA PAYLOAD AGGREGATION FOR DATA STORAGE SYSTEMS

CROSS REFERENCE TO RELATED APPLICATIONS

This application incorporates by reference for all purposes the full disclosure of co-pending U.S. patent application Ser. No. 15/279,225, filed concurrently herewith, entitled "COMMAND AGGREGATION FOR DATA STORAGE OPERATIONS", co-pending U.S. patent application Ser. No. 15/279,296, filed concurrently herewith, entitled "CONTEXTUAL OPTIMIZATION FOR DATA STORAGE SYSTEMS", co-pending U.S. patent application Ser. No. 15/279,304, filed concurrently herewith, entitled "DATA PAYLOAD CLUSTERING FOR DATA STORAGE SYSTEMS", co-pending U.S. patent application Ser. No. 15/279,316, filed concurrently herewith, entitled "CLIENT-BASED BATCHING OF DATA PAYLOAD", and co-pending U.S. patent application Ser. No. 15/279,348, filed concurrently herewith, entitled "COMMAND PARALLELIZATION FOR DATA STORAGE SYSTEMS".

BACKGROUND

As computing systems and data storage schemes become increasingly complex, especially in light of the increasing complexity and data consumption associated with applications associated therewith, the variety of data types and container sizes (e.g., file sizes) is becoming more diverse. At the same time, the sheer quantity of such objects is increasing at a dramatic rate.

Distributed computing and data storage systems may be provided by a computing resource service provider, and such systems are increasingly used to handle large volumes of computing and data storage operations. However, the overall efficiency and scaling ability of such systems can be adversely affected by inefficiencies in the file systems and other underlying resources that comprise them. For example, the storage of small files can be inefficient in some systems, as the transactional overhead, on a per-file basis, makes up a greater percentage of the overall processing burden than for larger files.

BRIEF DESCRIPTION OF THE DRAWINGS

Various techniques will be described with reference to the drawings, in which.

DETAILED DESCRIPTION

Figure 1:
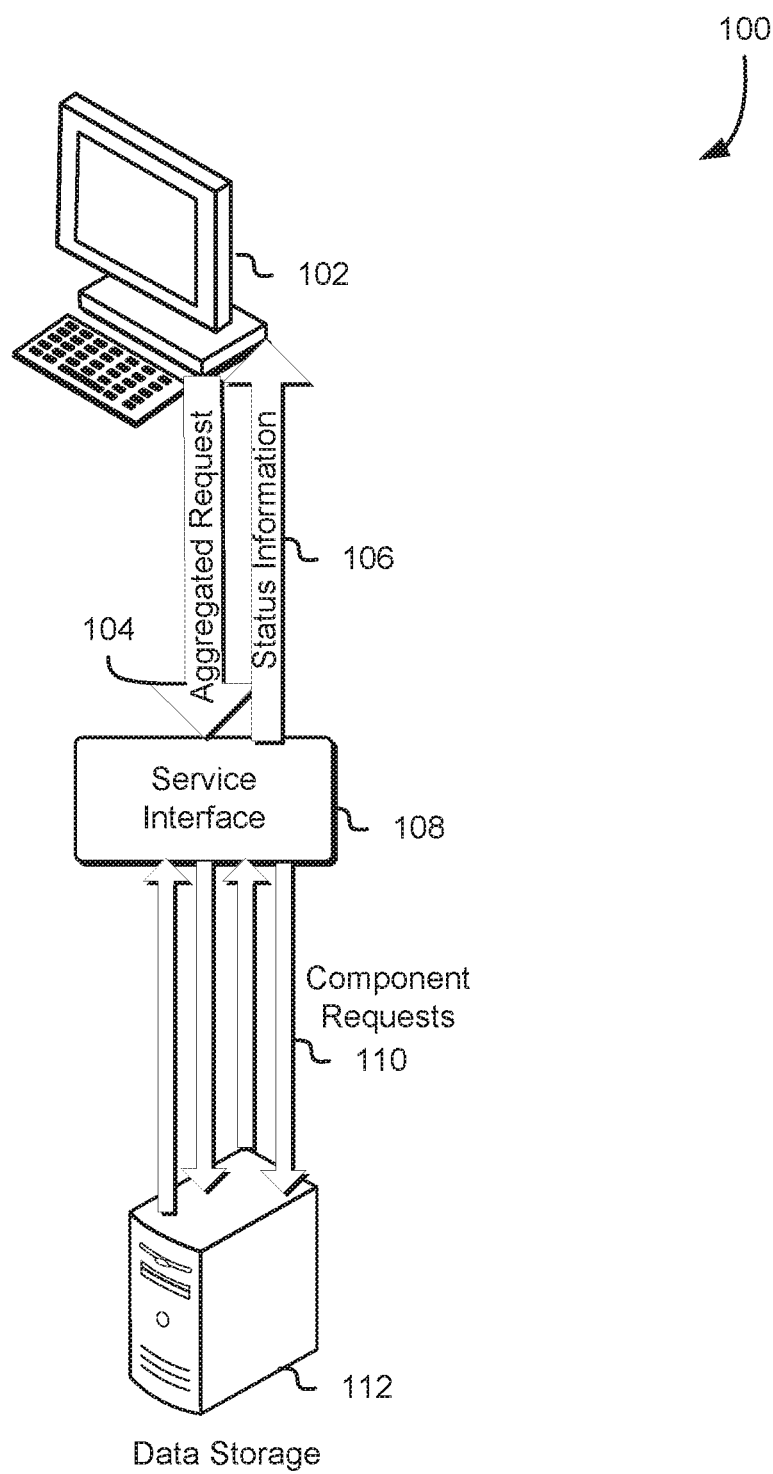
FIG. 1 illustrates an example environment in which an entity, such as a service interface, processes data storage requests to generate and transact a plurality of component requests on behalf of a requesting entity, in accordance with some embodiments.

In one example, a system, such as a data storage system, implements one or more entities, such as a service interface or entity associated therewith, that processes data storage requests that are aggregated so as to reduce the number of incidental requests, commands, calls, etc. with that request. For example, a customer device (interchangeably also referred to herein as a "client device"), interacts with a front end interface or other interface to request storage of data payload (e.g., files or other data objects, raw data, etc.) on data storage of an implementing system.

The customer device may submit an aggregated data storage request that includes one or more incidental component requests, e.g., handshaking and other requests expected or otherwise associated by an implementing data storage system, such as by a file system implemented on the data storage system, in connection with the actual data storage request. For example. a given file system command associated with storing a given file on an implemented file system may necessitate one or more other file system commands associated with that file system command, such as those determining whether the file to be stored already exists on the file system, whether to overwrite it if it does, whether a directory to which the file is intended to be written exists, whether to create it if it does, and so on. Each of these additional file system commands may, in some systems, ordinarily result in one or more calls to another entity, such as the originating requestor customer device.

However, the aggregated data storage request may include information, including predetermined responses and/or some or all of the component requests (and/or responses thereto), such that such additional calls may be avoided (e.g., preempted). As described herein, this may be implemented in a number of ways. For example, the service interface may receive the aggregated data storage request from the customer entity and pass it directly to a data storage entity for processing, such that the data storage entity itself may process the aggregated data storage request and, e.g., ignore any extraneous information in the aggregated storage request when it does so.

As another example, the customer entity may submit a non-aggregated data storage request (e.g., a request that does not include preemptive responses to incidental component requests, or the incidental component requests themselves). The receiving service interface may also obtain default preferences, or preferences associated with the specific data storage request, and generate an aggregated data storage request from these preferences, to be sent to the data storage entity for further processing. Such preferences may be received from the customer entity (or some other entity) as a separate request, determined from a policy defined by or on behalf of the requesting customer entity (e.g., as managed by a policy management service provided by a computing resource service provider), predetermined by the service interface and/or data storage entity (e.g., as system defaults in the absence of other definitions or preferences), or, in certain embodiments, implied from the content of the data storage request itself.

In some embodiments, the service interface (or other entity associated therewith) may, rather than pass an aggregated request to the data storage entity, act as a surrogate for the requestor and, in response to transaction of component requests from the data storage entity in association with the data storage request, respond to the component requests using the aforementioned preferences or other information, rather than pass such requests as calls to the requestor.

In some embodiments, exceptions or other status information related to the requests, e.g., aggregated requests, may be sent from the data storage entity to the service interface, which in turn may expose such status information to the requestor, such as on a synchronous or asynchronous "push" basis, as a response to the requestor's original data storage request, or upon a separate request from the requesting customer entity (e.g., a status update request). Such exceptions may be generated by the data storage as a result of, e.g., insufficient or incorrect information in the aggregated request, extraneous information provided by or on behalf of the requestor, preferences set in conflict with system defaults and/or policies, and the like. Such exceptions may be fatal or merely advisory. The status information may also include updates regarding the progress of the data storage request, regardless of the final disposition of the request.

In some examples, the service interface may make determinations as to whether to aggregate, according to the techniques just described, data storage requests or to process them in the fashion otherwise directed by the data storage (e.g., by characteristics of the file system implemented thereon), based at least in part on one or more parameters associated with the incoming data storage request, the service interface, and/or the data storage entity. For example, the service interface may directly pass or aggregate, on behalf of a requestor, data storage requests associated files or other data objects under a specified size threshold to the data storage system, while normally processing data storage requests (e.g., by passing incidental component requests and/or associated calls back and forth with the requestor) with files of a size equal to or over that threshold. Other parameters may include, by way of example, data storage system load or other parameters, service interface load or other parameters, priorities and/or other variables associated with the specific requests, and the like.

In some examples, the data storage entity may transact a reduced set of component requests associated with an incoming data storage request and/or associated file system command. For example, the data storage entity may implement a file system such that, if the file system requests additional information from the data storage entity to execute a given file system command (e.g., so as to perform additional file system commands required, incident to, or otherwise associated with the given file system command), if such additional information is not already available to the data storage system (e.g., as part of an associated aggregated request), rather than submit additional requests to the service interface (e.g., additional requests/calls) and/or the requestor, it may instead throw an exception (which may be received and forwarded to the requestor by the service interface). Such reduction of component requests may be implemented for a subset of incoming data storage requests, e.g., based at least in part on parameters associated with the data associated with the data storage requests, the requests themselves, the data storage system, the service interface, the requestor, or other entities.

In some examples, a service interface or other entity may, at least on the basis of the aforementioned parameters, such as file or other object size threshold, aggregate the data payload of one or more data storage requests into a data storage container having an associated mapping table to each object within the data storage container. For example, data storage requests associated with data payloads having files under a specified size threshold may be aggregated by or at the direction of the service interface into a TAR file, ZIP file, ISO file, or some other self-enclosed file system (whether compressed or uncompressed) and stored, as a unitary object, on a file system of the data storage entity (e.g., addressed at the same level as other files within the file system). The aggregation may involve some or all of the data payload of each of the data storage requests so aggregated. For example, if a given payload associated with a request includes some objects larger than a threshold and other objects smaller than a threshold, such "small" objects may be combined with other "small objects" associated with other data storage requests into the aforementioned data container. As another example, if the proportion of files under the size threshold in payload associated with a given request is itself above a given threshold, the entire payload may be added to a data container prior to being committed to data storage. The mapping table itself may be stored within the data container, in the file system but separate from the data container, or stored on another entity altogether.

The implementing system may also implement the aforementioned data payload aggregation techniques in a client interface of the customer device or other requestor. Such a client interface may transparently perform the techniques just described, on a per-request basis (or across multiple requests if the client interface accepts multiple data storage requests from the same requestor at any given time). In such examples, the data storage requests processed by the client interface generates other data storage requests, at least in the case where some of the data payloads are aggregated into a data container. As may be contemplated, these techniques may be combined with any of the others described herein.

As another example, a system may provide a requestor the option to formulate such data containers containing multiple data objects, such as files, to be processed by the service interface and, thereon, the data storage, so as to store the contents therein as individual files. In such examples, the data container is submitted to the data storage with a flag or other indication that it includes data objects to be extracted and stored in the data storage, rather than have the data container itself be stored in the data storage. The data container received by the data storage may be validated for integrity, and its contents assessed for conformation to one or more constraints or requirements enforced by the service interface and/or the data storage, prior to being committed directly to the file system. Such validation may be performed by the service interface, the data storage entity, a client interface, or any other entity prior to or in connection with the extraction and/or storage of the objects contained within.

In some embodiments, an implementing system, such as a data storage system, may provide a service interface that includes a disparate control plane and data plane so as to further optimize the processing of data storage requests, especially in the case where a large number of data storage requests are being processed at any given time. For example, the file system commands, preferences, and other incidental data and metadata associated with a data storage request but excluding the data payload may be received and processed by a control plane, so as to carry out some or all of the techniques described herein. Asynchronously or synchronously, the data payloads associated with such requests may be received and processed by a data plane, excluding the commands, metadata, etc., other than information identifying the data storage request(s) to which the data payloads are associated. This bifurcation allows the different "streams" to be handled in different ways. For example, the control plane may interact with a requestor using a secure channel, such as via TLS/SSL, while the data payload, which may be pre-encrypted by, e.g., a client interface, may be transacted with less overhead using a less secure channel (e.g., regular HTTP).

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 in which an entity, such as a service interface, processes data storage requests to generate and transact a plurality of component requests on behalf of a requesting entity, in accordance with some embodiments.

A system, such as a data storage system 112, implements one or more entities, such as a service interface 108 or entity associated therewith, that processes data storage requests 104 that are aggregated so as to reduce the number of incidental requests, commands, calls, etc. with that request. For example, a customer device 102 (interchangeably also referred to herein as a "client device"), interacts with a service interface 108, such as a front end interface or other interface associated with the data storage 112, to request storage of a data payload (e.g., files or other data objects, raw data, etc.) on the data storage 112.

The customer device 102 may be any device, or virtualized version thereof, capable of transacting data storage requests and/or data with an interface, such as the service interface 108, of a data storage entity 112, such as over a network, e.g., an intranet or the Internet. For example, the customer device may be a computer system, such as a laptop, desktop, or server, a mobile device such as a smartphone, smartwatch, or tablet computer, a network-connected appliance or associated sensor, and the like. As another example, the customer device 102 may be one or more virtual machines provided by resources of a computing resource service provider. As yet another example, the customer device 102 may be a service or associated interface of the same or different computing resource service provider as that implementing the data storage 112.

The service interface 108 may be any entity capable of interacting, programmatically or otherwise, with the customer device 102 and the data storage 112. For example, the service interface 108 may be one or more resources of a computing resource service provider implementing a programmatic interface and/or a user interface on behalf of the data storage 112. In the case of a programmatic interface, the interface may be an application programmatic interface, a web service interface, or the like. The resources used to implement the service interface 108 may be the same, overlap with, or separate from those implementing the data storage 112. The aforementioned resources may be used to process data, such as the incoming requests and their associated payloads, as well as to issue, forward, generate, and otherwise manipulate data storage requests, component requests, file system commands, status information 106 (e.g., exceptions), and the like.

The data storage entity 112 may be any resource or set of resources capable of receiving data storage requests and/or file system commands and processing such requests and/or commands so as to commit an associated data payload to data storage media. The data storage 112 may be configured with one or more file systems, such as FAT (FAT12, FAT16, FAT32), exFAT, NTFS, HFS, HFS+, HPFS, APFS, UFS, ext2, ext3, ext4, XFS, btrfs, ISO 9660/Joliet, File-11, Veritas File System, VMFS, ZFS, ReiserFS, UDF, JFFS, JFFS2, YAFFS, UBIFS, Log FS, F2FS, LTFS/LTFS-SDE, GFS2, GPFS, SFS, CXFS, StorNext, BeeGFS, Ceph, GfarmFS, Infinit, GFS, DFS, GlusterFS, HDFS, IPFS, iRODS, LizardFS, MooseFS, OneFS, OrangeFS, ObjectiveFS, Panfs, RozoFS, Torus, Parallel Virtual File System XtreemFS, NFS, SMB/CIFS, AFP, and NCP, among others. The file systems may be implemented directly on the data storage media, an abstraction thereof (e.g., such as implemented atop a network block device, such as an iSCSI block device), or in a virtualized environment. The data storage entity may be a hardware device that receives data to be later transferred to an archival data storage service, such as may be implemented by a computing resource service provider. The data storage entity may further implement one or more redundancy coding techniques, such as grid or bundle encoding techniques, so as to further increase the durability of the data stored thereon according to techniques described below in connection with at least FIGS. 15-18.

The customer device 102 may submit an aggregated data storage request 104 to the service interface 108. The aggregated data storage request is, in an embodiment, a data storage request to store a file in a specific location in a file system of the data storage system, along with one or more incidental, subservient, or otherwise related component requests 110, e.g., handshaking and other requests expected or otherwise associated by the file system, in connection with the actual data storage request 104. As used herein, the terms "component request" and "subrequest" are used interchangeably, and refer, as described in further detail herein, to one or more requests, such as file system commands or associated programmatic requests (e.g., API calls), that relate to another data storage request, such as by being triggered by that data storage request.

For example, a file system command for storing a given file on an implemented file system may necessitate one or more other file system commands associated with that file system command, such as those determining whether the file to be stored already exists on the file system, whether to overwrite it if it does, whether a directory to which the file is intended to be written exists, whether to create it if it does, what further steps to take if there is an error in storing the file, and so on. Each of these additional file system commands may, in some systems, ordinarily result in one or more calls to another entity, such as the originating requestor customer device.

However, as mentioned, the aggregated data storage request 108 may include information, including predetermined responses and/or some or all of the component requests 110 (and/or responses thereto), such that such additional calls, e.g., to the customer device 102, may be preempted, avoided, or ignored. As illustrated, the service interface 108 may receive an aggregated data storage request 104 and act as a surrogate for the requestor for the incidental calls/component requests 110. For example, in response to transaction of component requests 110 from the data storage entity 112 in association with the data storage request 104, the service interface 108 responds to the component requests 110 using the aforementioned preferences or other information included in the aggregated request 104, rather than pass such requests as calls to the requestor for responses therefrom.

As another example, the customer entity may submit a non-aggregated data storage request (e.g., a request that does not include preemptive responses to incidental component requests, or the incidental component requests themselves) to the service interface 108. The receiving service interface 108 may, in response, obtain default preferences, or preferences associated with the specific data storage request, and generate an aggregated data storage request from these preferences, which may be internally processed so as to enable the service interface 108 to respond to incident or component requests 110 arising from the data storage request (e.g., after that request is sent to the data storage for fulfillment). Alternatively, the generated aggregated data storage request may be directly processed by the data storage 112, according to techniques described in further detail elsewhere herein. Such preferences may be received from the customer entity 102 (or some other entity) as a separate request, determined from a policy defined by or on behalf of the requesting customer entity (e.g., as managed by a policy management service provided by a computing resource service provider, such as the computing resource service provider implementing at least the data storage 112), predetermined by the service interface 108 and/or data storage entity 112 (e.g., as system defaults in the absence of other definitions or preferences), or, in certain embodiments, implied from the content of the data storage request 104 itself.

Figure 2:
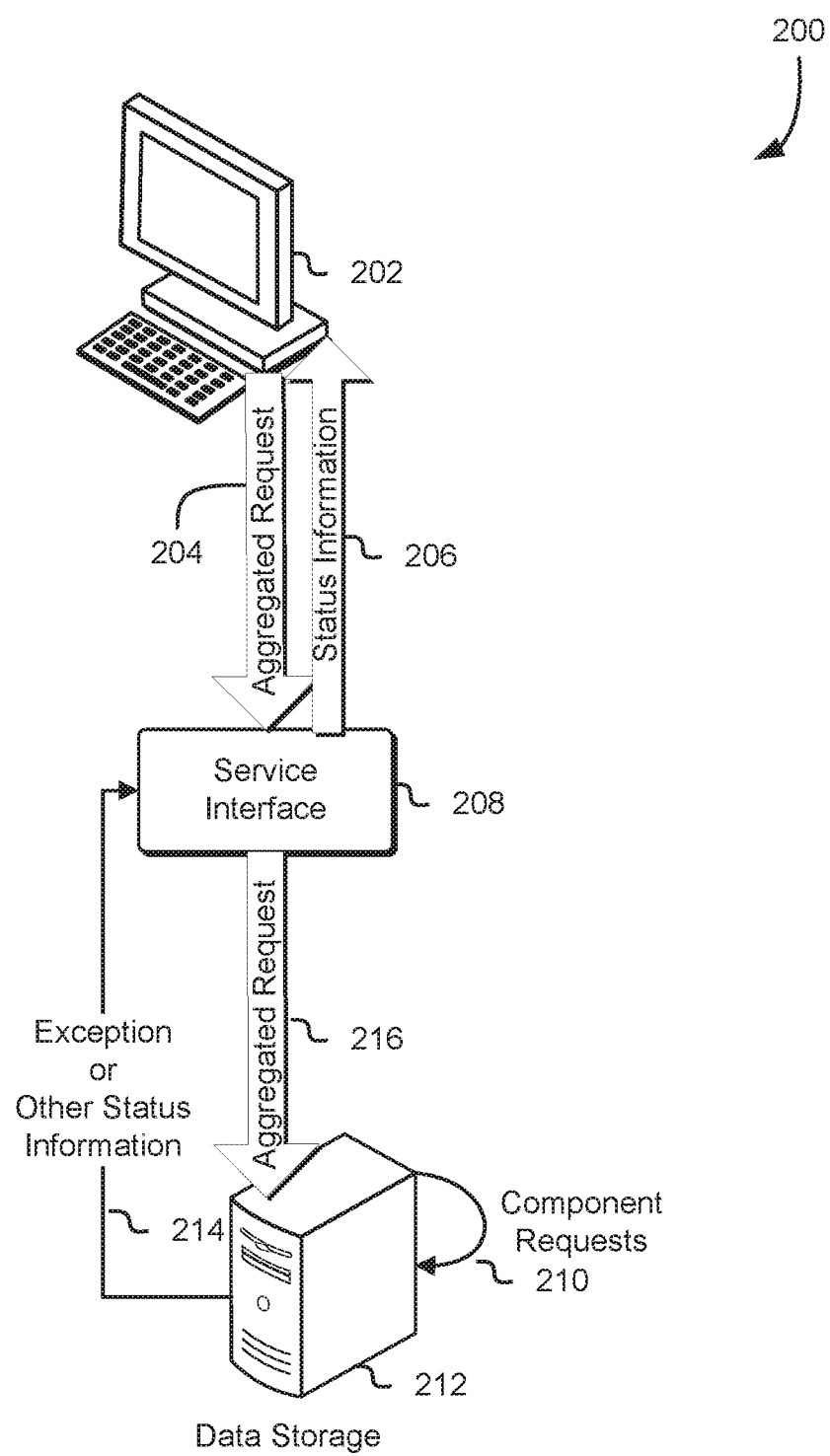
FIG. 2 illustrates an example environment in which an entity, such as a service interface, forwards an aggregated data storage request to data storage configured such that the aggregated request can directly be executed without further related interaction to execute the request, in accordance with some embodiments.

FIG. 2 illustrates an example environment 200 in which an entity, such as a service interface, forwards an aggregated data storage request to data storage configured such that the aggregated request can directly be executed without further related interaction to execute the request, in accordance with some embodiments.

As mentioned, the aggregated data storage request 204 received from customer device 202 may include information, including predetermined responses and/or some or all of the component requests (and/or responses thereto), such that such additional calls may be avoided (e.g., preempted). In the illustrated example, the service interface 208 receives the aggregated data storage request 204 from the customer entity 202 and passes it directly to a data storage entity 216 for processing, such that the data storage entity 216 itself processes the aggregated data storage request. In some embodiments, the data storage entity 212 internally generates and/or fulfills component requests incident (e.g., subservient) to the core file system command or data storage request without interaction with the service interface 208 or the customer device 202.

In such embodiments, the data storage entity 212 ignores any extraneous information in the aggregated storage request 208. For example, if the aggregated request 204 includes preferences for file overwrites and directory creation if the requested directory does not exist, yet the associated file system command to the data storage is for a file that did not previously exist and the requested directory does already exist, the file overwrite preference and the directory creation preferences in the aggregated request 204 are ignored.

In some embodiments, an aggregated request 204 may, when processed by the data storage 212, result in exceptions or other cause the generation of status information related to the aggregated request 216 or the associated component requests 210. Such exceptions may be generated by the data storage 212 as a result of, e.g., insufficient or incorrect information in the aggregated request, extraneous information provided by or on behalf of the requestor, preferences defined in the aggregated request that are in irreconcilable conflict with each other and/or with system defaults and/or policies, and the like. Such exceptions may be fatal or merely advisory. The status information may also include updates regarding the progress of the data storage request, regardless of the final disposition of the request.

Such exception(s) or other status information 214 may be sent from the data storage entity 212 to the service interface 208, which in turn may expose 206 such status information to the requestor 202, such as on a synchronous or asynchronous "push" basis, as a response to the requestor's original data storage request, or upon a separate request from the requesting customer entity (e.g., a status update request). The status information 206 may be provided programmatically (e.g., via an API or web service call) or via a user interface to the customer device 202. In some embodiments, the interface through which the status information 206 is provided to the customer device 202 is the same as the interface through which the customer device 202 provided the aggregated request 204. Similarly, the interface through which the data storage entity 212 provides the exception(s) or other status may be the same or different from the interface through which the data storage 212 receives the aggregated request 216.

Figure 3:
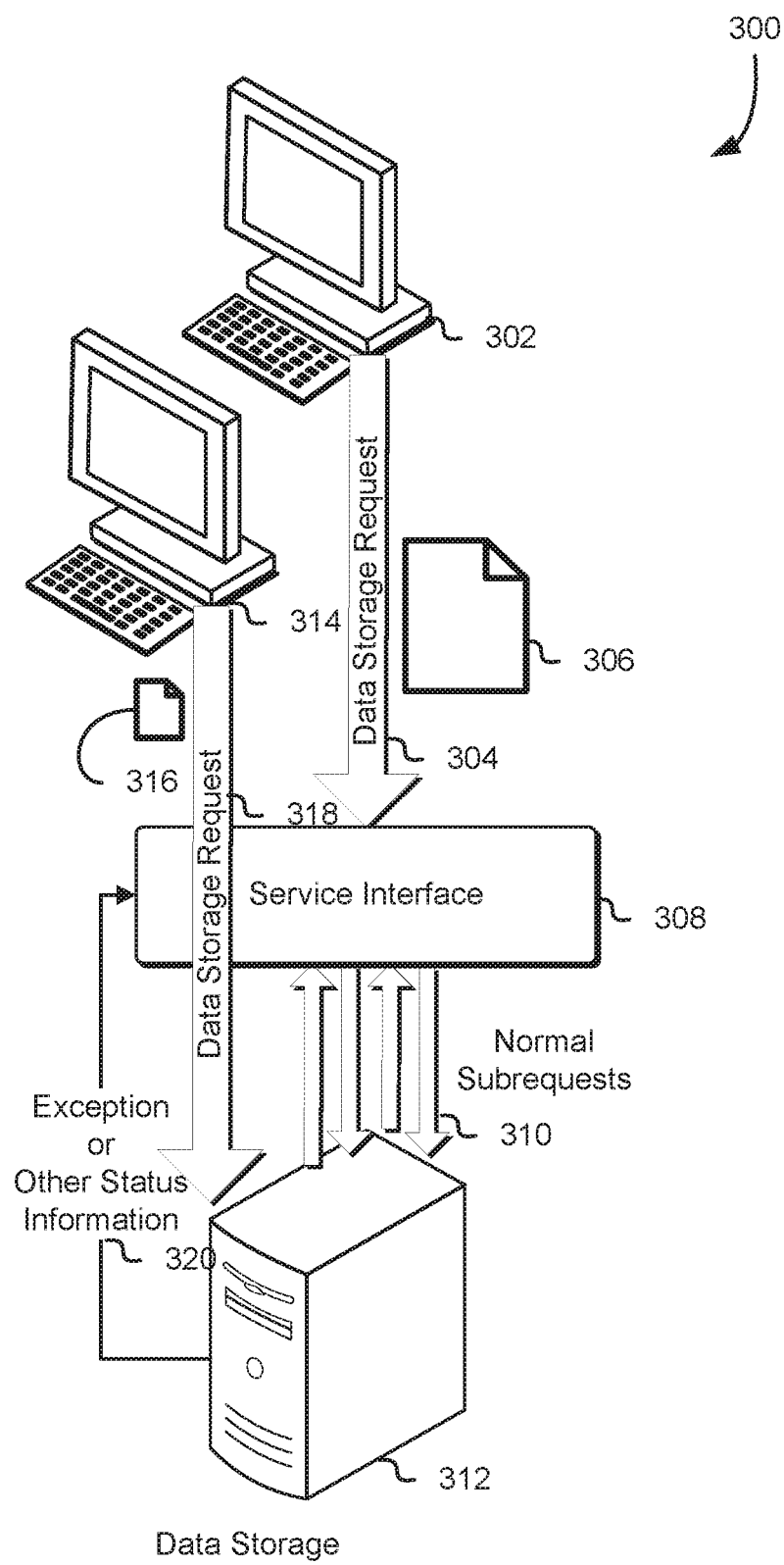
FIG. 3 illustrates an example environment in which an entity, such as a service interface, determines the manner in which to pass and/or execute data storage requests received for different data payloads to be stored in data storage, in accordance with some embodiments.

FIG. 3 illustrates an example environment in which an entity, such as a service interface, determines the manner in which to pass and/or execute data storage requests received for different data payloads to be stored in data storage, in accordance with some embodiments.

In some embodiments, the service interface 308 makes determinations as to whether to pass, process, and/or aggregate data storage requests 304, 318, according to the techniques described herein (e.g., in FIGS. 1-3 above). For example, such determinations may be made based at least in part on one or more parameters associated with the incoming data storage request (e.g., the associated data payload(s), the service interface, and/or the data storage entity. In the illustrated example, customer devices 302, 314, submit, via the service interface 308, respective data storage requests 304, 318 involving respective data payloads 306, 316. The data payload 306 associated with data storage request 304 is equal to or over a minimum size threshold set, e.g., as a policy of the data storage entity and/or the service interface 308; the data payload 316 associated with data storage request 318 is smaller than the aforementioned minimum size threshold.

The service interface 308 determines the object and/or payload sizes of the objects associated with the respective payloads 306, 316, and operates differently with respect to the respective data storage requests 304, 318. As an example, the service interface 308 may directly pass or aggregate, on behalf of the requestor 314, the data storage request 318 to the data storage system 312 for processing (e.g., according to the techniques described above in connection with FIGS. 1-3, as its associated data payload 316 includes files or other data objects under the specified minimum size threshold to the data storage system. On the other hand, the service interface 308 detects that data storage request 304 is associated with a data payload 306 that includes objects larger than this size, and thus either interacts with the data storage entity 312 to service the incident subrequests/component requests, and, in some embodiments, passes them to the requestor 302 for response. As with FIG. 2, exception(s) may be thrown, or other status information generated 320, by the data storage entity 312, in connection with the processing of such data storage requests, and such exceptions and/or other status information 320 is passed to the service interface 308, e.g., to be made available to one or more of the requestors or other entities.

Other modes of operation as between the service interface 308, the data storage entity 312, and the customer devices 314, 302, are contemplated hereby. For example, the data storage entity 312 may transact a reduced set of component requests (e.g., 310) associated with an incoming data storage request and/or associated file system command, optionally dependent on the nature of the incoming data storage request itself. For example, the data storage entity 312 may implement a file system such that, if the file system requests additional information from the data storage entity to execute a given file system command (e.g., so as to perform additional file system commands required, incident to, or otherwise associated with the given file system command), if such additional information is not already available to the data storage system 312 (e.g., as part of an associated aggregated request), rather than submit additional requests to the service interface 308 (e.g., additional requests/calls) and/or the requestor(s) 302, 314, it may instead throw an exception 320 (which may be received and forwarded to the requestor by the service interface 308, as described). As mentioned, such reduction of component requests may be implemented for a subset of incoming data storage requests, e.g., based at least in part on parameters associated with the data associated with the data storage requests, the requests themselves, the data storage system, the service interface, the requestor, or other entities.

While size thresholds have been provided as an example of the aforementioned parameters, other kinds of parameters are contemplated herein. For example, the parameters may include, data storage system load, throughput, latency, and other metrics, service interface load, throughput, latency, and other metrics, priorities assigned to the specific requests, size thresholds (both minimum and maximum), available level of scaling, and/or utilization of the implementing computing resource service provider, transaction volumes, and other statistics related to the incoming data storage requests, modeling of the file system performance, the specific configuration of the data storage 312, and the like. The threshold may be set by or in connection with, e.g., a performance monitor associated with any of the various entities involved with transacting and/or executing the requests, or a separate monitoring entity from those entities. The threshold(s) may be set automatically (e.g., for adaptive optimization), manually, or some combination in between. For example, an administrator or developer may set one or more threshold(s) manually so as to induce the overall system to behave in a specific way, so as to, e.g., debug or audit one or more functions of the system.

Figure 4:
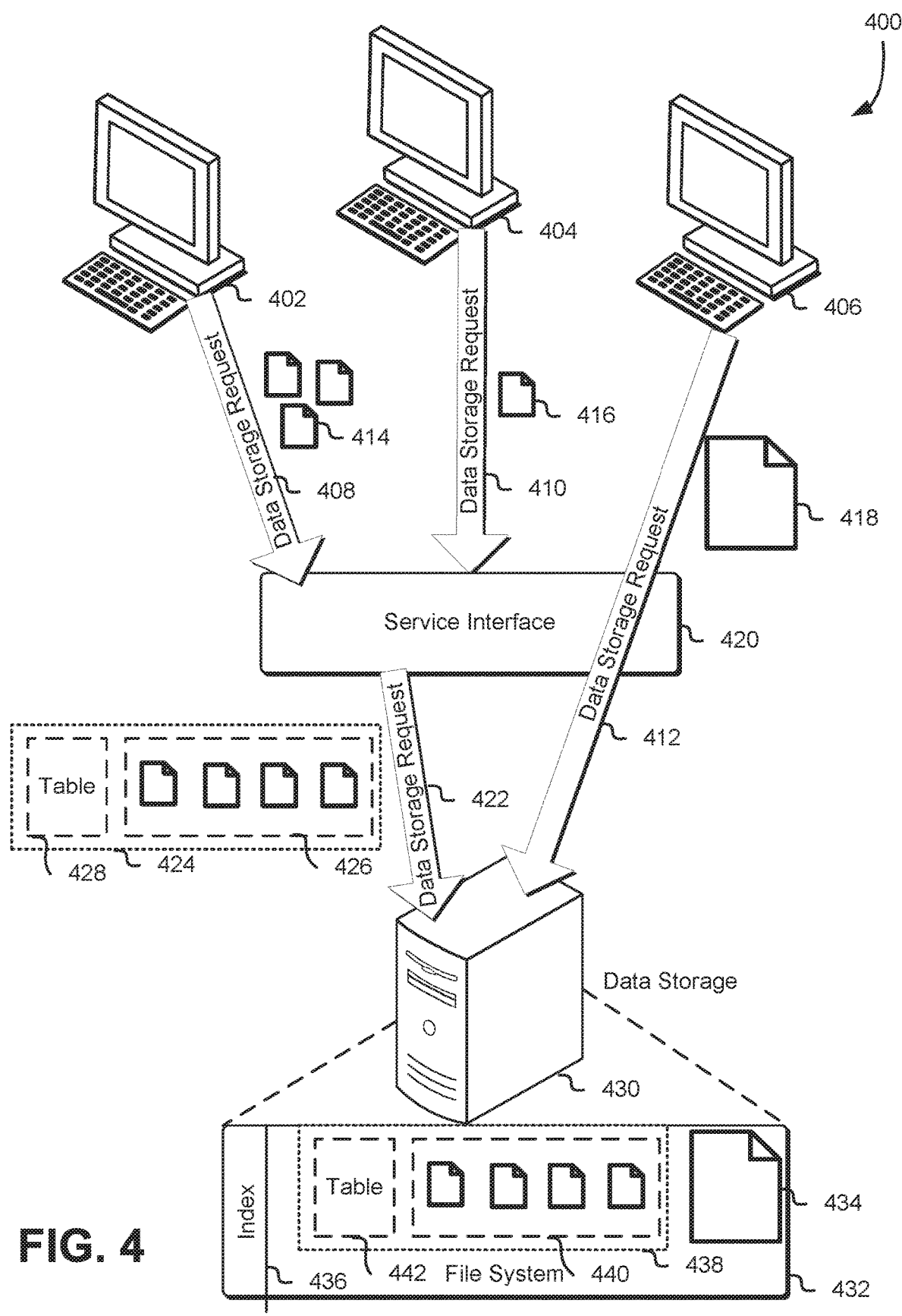
FIG. 4 illustrates an example environment in which an entity, such as a service interface, processes a plurality of data storage requests so as to aggregate a subset of the associated data, according to one or more policies associated therewith, into data containers for storage in a data storage, in accordance with some embodiments.

FIG. 4 illustrates an example environment 400 in which an entity, such as a service interface, processes a plurality of data storage requests so as to aggregate a subset of the associated data, according to one or more policies associated therewith, into data containers for storage in a data storage entity, in accordance with some embodiments.

In some examples, a service interface 420 or other entity may, at least on the basis of the parameters mentioned in connection with FIG. 3, such as file or other object size threshold, aggregate the data payload of one or more data storage requests into a data storage container having an associated mapping table to each object within the data storage container. In the illustrated example, customer devices 402, 404, 406 issue respective data storage requests 408, 410, 412 associated with data payloads 414, 416, 418 to the service interface 420. As illustrated, the data payload 414 includes several "small" files; data payload 416 includes a single "small" file, and data payload includes a single "large" file, where "small" means that the file has a size below a given threshold, and "large" means that the file has a size above that threshold (and, depending on the implementation, exactly equal to the threshold may mean either "small" or "large").

The service interface 420 determines the aforementioned characteristics of the objects within the respective data payloads 414, 416, 418, and aggregates the payloads 414, 416 (on account of having "small" files) into a data container 424, such that all objects across both payloads 414, 416 are contained 426 within the data container 424 and, optionally, indexed in a mapping table 428. The data container may be any compressed or uncompressed single object that combines one or more other objects. Examples include archive file formats, such as ISO-9660, tape archive (.tar), Unix archiver (.a, .ar), and the like; compression applied to archive file formats, such as .tar files compressed using bzip2 (.tar.bz2), gzip (.tar.gz), lzip, (.tar.lz), lzma, lzo, rzip, Snappy, xz, pack, compress, and the like; inherently compressed archival file formats, such as 7z, 7zX, ARC, ARJ, B1, Cabinet, Apple Disk Image, RAR, ZIP, and the like; other file systems, including the file systems mentioned above (such that the data container is still addressable as a unitary object by the file system 432 of the data storage entity 430), and so on.

The mapping table 428 may be any index, data store, key-value store, etc., database table, that identifies the contents, locations, offsets, etc. of the aggregated data payload 426 within the data container 424. The mapping table 428 may be inherent to the type of data container used, otherwise included within the data container, or may be separate from the data container (e.g., a separate journal or log). The mapping table 428 may be stored on multiple resources or nodes of a distributed computing system, such as a distributed computing system or associated resources made available to customer entities (e.g., customer devices) connecting to a computing resource service provider.

The data container 426 is submitted as part of a combined data storage request 422 by the service interface 420 for storage within the file system 432 of the data storage entity 430. From the perspective of the file system 432, the data container 438 is simply another object, even though it may contain multiple other data objects 440 and/or a mapping table 442. Accordingly, the index 436 of the file system 432 may reference the data container 438. However, in some embodiments, the index of the parent file system 432 may be updated so as to include a reference or pointer to the table 442, thereby allowing for the data container's contents to be journaled at the same level as other, standalone objects within the parent file system 432 (e.g., data object 434).

The service interface, according to techniques previously described, may, as illustrated pass the data storage request 412 directly to the data storage 430 without aggregation into a data container on account of its associated data payload (or some or all of its constituent objects) 418 being "large." Accordingly, the payload 418 is stored directly on the file system 432 as an object 434.

The aggregation may involve some or all of the data payload of each of the data storage requests so aggregated. For example, if a given payload associated with a request includes some objects larger than a threshold and other objects smaller than a threshold, such "small" objects may be combined with other "small objects" associated with other data storage requests into the aforementioned data container. As another example, if the proportion of files under the size threshold in payload associated with a given request is itself above a given threshold, the entire payload may be added to a data container prior to being committed to data storage. The mapping table itself may be stored within the data container, in the file system but separate from the data container, or stored on another entity altogether.

It is contemplated that data retrievals may be aggregated, as well. For example, if one or more data objects (e.g., files) are requested over time, rather than service a specific retrieval request immediately (e.g., by retrieving the data container, placing it in memory associated with a resource, and extracting the data to provide the data through the service interface or some other intermediary interface/entity to a requestor), an implementing service interface or other entity may delay the availability of data, the extraction of the data from the data container, or even the retrieval of the data container itself (and/or delaying the placement of said data container in memory for further processing) for a length of time, which may be defined manually or automatically according to, e.g., one or more parameters as previously discussed. As another example, such delay(s) may be made until a designated number of other objects from that container have also been requested pursuant to one or more other data retrieval requests, so as to further optimize retrieval efficiency.

Figure 5:
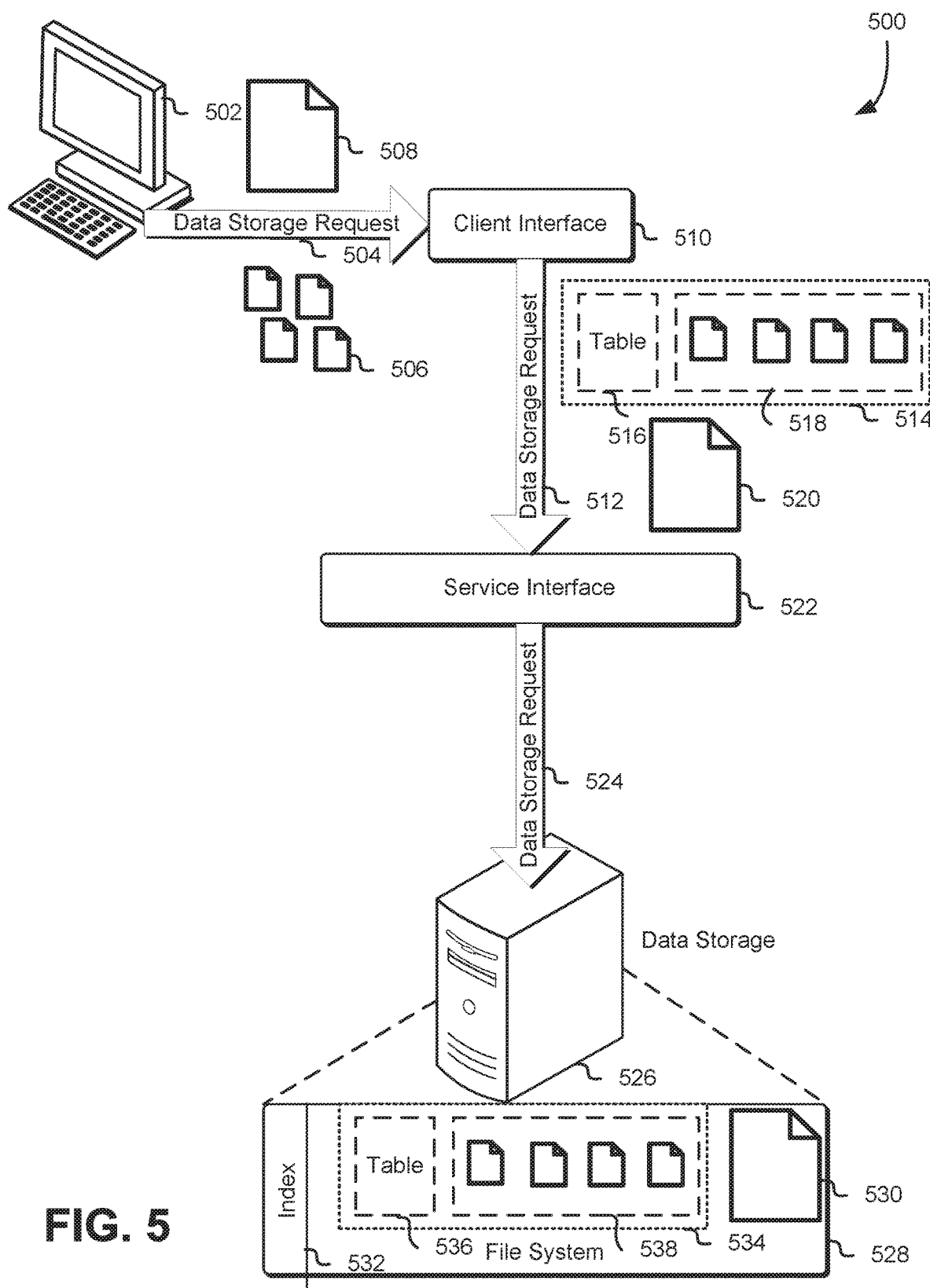
FIG. 5 illustrates an example environment in which an entity, such as a client interface, is implemented on a client entity to process one or more data storage requests, so as to determine whether to directly pass the requests or package some or all of the associated data payload in a data container in connection with the requests, in accordance with some embodiments.

FIG. 5 illustrates an example environment 500 in which an entity, such as a client interface, is implemented on a client entity to process one or more data storage requests, so as to determine whether to directly pass the requests or package some or all of the associated data payload in a data container in connection with the requests, in accordance with some embodiments.

While FIG. 4 illustrates an example where the payload aggregation occurs at the service interface, the implementing system may alternatively (or additionally) implement the aforementioned data payload aggregation techniques in a client interface 510 of (or associated with) the customer device 502 or other requestor. Such a client interface may transparently perform the techniques described herein, whether on a per-request basis or across multiple requests (e.g., if the client interface 510 accepts multiple data storage requests from the same requestor at any given time).

In such examples, the data storage requests processed by the client interface generates other data storage requests, at least in the case where some of the data payloads are aggregated into a data container. For example, the customer device 502 submits a data storage request 504 associated with variety of data objects 506, 508, either as a single payload or multiple payloads, to a client interface 510. As with the example provided in connection with FIG. 4, some of the objects are "small" 506 and some are "large" 508. Again, while object size is provided as an example parameter, other parameters may be used to differentiate the objects.

The client interface 510 may be any interface capable of receiving or intercepting data storage requests and transacting such requests, or other requests descended therefrom, to a service interface 522. The client interface may be programmatic, such as an API or a web service call, and/or it may be a user interface. In some embodiments, the client interface may be transparent in the sense that the customer device 502 submits data storage requests directly to the service interface 522, but the client interface 510 intercepts the requests and makes determinations as to whether it will pass the request, modify the request, or replace/transform the request before the outcome is sent to the service interface 522.

In the present illustrated example, the client interface 510, similarly to FIG. 4, aggregates the "small" files 506 into a data container 514, such that the data container includes the files 518 (e.g., in compressed or otherwise archived format) and, optionally, a mapping table 516 associated with those files 518. The "large" object 520 is not thus packaged. The resulting data storage request 512, now associated with the data container 514 and the large file 520, is sent to the service interface 522 for processing according to other techniques described herein, and is then passed on 524 to data storage 526 for processing. The data storage entity 526, as with the example provided in connection with FIG. 4, stores the data container 534 containing small files 538 and mapping table 536 such that the data container 534 is addressed as an object, just as with large file 530 (corresponding with large file 508, 520), and both the container 534 and the large file 530 are journaled or otherwise indexed in the index 532 of the file system 528. As before, the mapping table may be referenced by the index 532, and, in some embodiments, may be stored outside of the data container 534, or, in some of such cases, outside of the file system 528 altogether (e.g., on a different data store).

Figure 6:
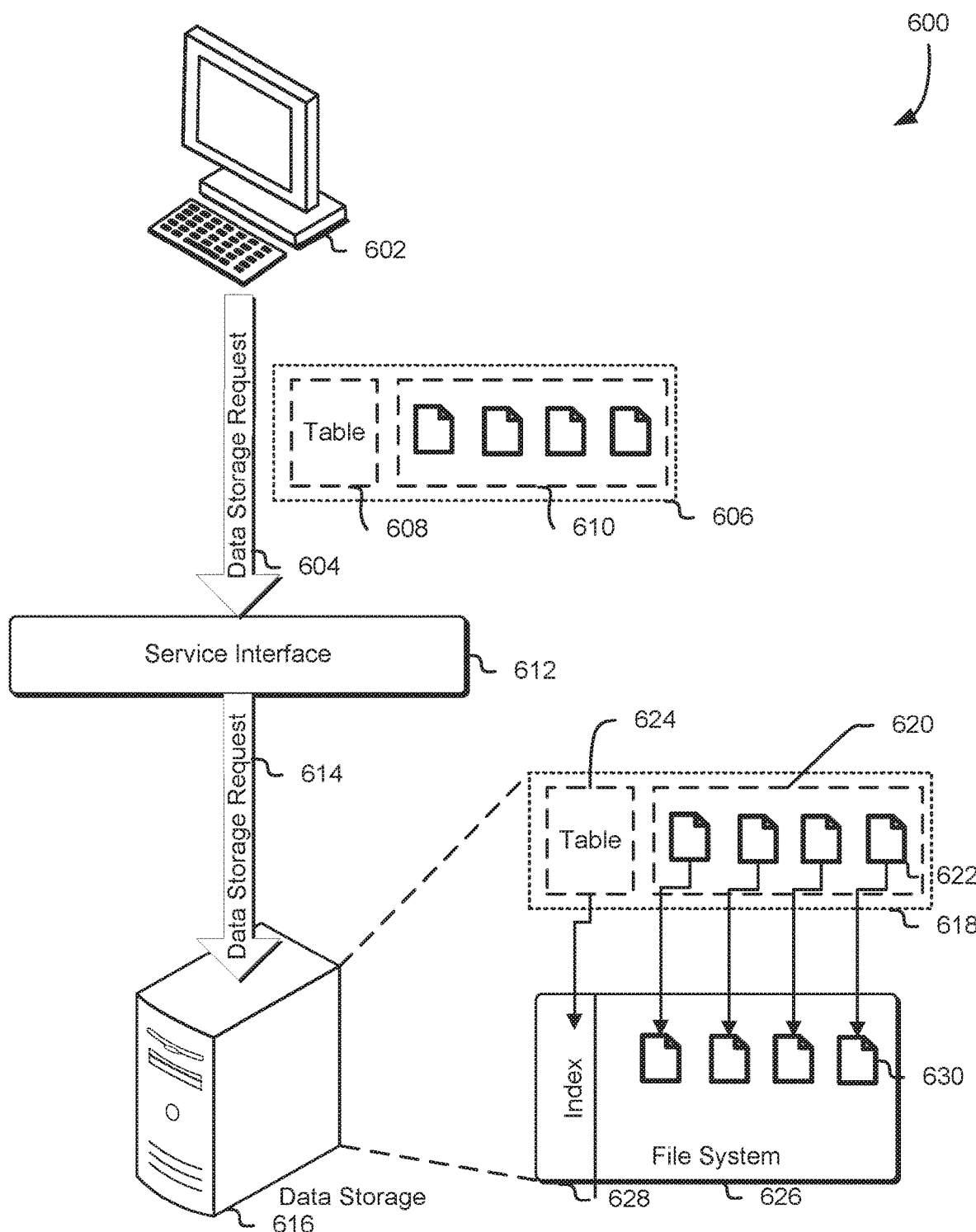
FIG. 6 illustrates an example environment in which an entity, such as a service interface, receives, for processing by data storage, data containers having data payload to be stored on the data storage, in accordance with some embodiments.

FIG. 6 illustrates an example environment 600 in which an entity, such as a service interface, receives, for processing by data storage, data containers having data payload 620 to be stored on the data storage, in accordance with some embodiments.

As another example, in addition to or instead of automatically aggregating data objects or payloads at the client interface and/or service interface, an implementing system may provide a requestor, such as the customer device 602, the option to formulate, of their own volition, data containers 606 containing multiple data objects 610, such as files, to be processed by the service interface and stored on the data storage 616 according to a mapping table 608. The mapping table 608 may be automatically generated (e.g., as prescribed by the specific data container format used) or separately generated and submitted as part of the data storage request 604.

To differentiate the processing of the data storage request 604 having the data container 606, the data container 606 may include a flag indicating that it requires processing as a data container according to the techniques described herein, rather than stored as an object. The flag may be included within the data storage request but not within the data container, within the data container itself, or separately from both. Alternatively, a flag may be implied by the service interface 612, by detecting the presence of the data container 606 in or associated with the data storage request 604, and/or based on the content of the data storage request 604 itself (such as header information, heuristics related to the data of the data container, the content of specific offsets or bytes within the data container, file or other object names within the data container, and the like).

The service interface 612 may then validate the contents of the data container 606, such as by checking data integrity, determining whether the contents themselves comply with requirements and/or constraints of the data storage 616 or other system (e.g., file name lengths and content, object size restrictions, virus scanning/heuristics, and the like), etc. Such validation may be conducted against the mapping table 608 or other manifest (e.g., information within the data storage request 604) and/or the actual payload 610 contained within the container.

After validating the data container 606, the service interface 612 passes the container on, via data storage request 614, to the data storage 616 for further processing, so as to store the contents therein as individual files in, e.g., the file system 626. For example, the data storage 616 reads the mapping table 624 and adds entries to the file system index 628 associated with the objects 622, which are in turn stored as objects 630 in the data storage file system 626. In some embodiments, the entire data container 618 may be stored as an object, e.g., according to techniques described in connection with FIGS. 4-5 above.

Figure 7:
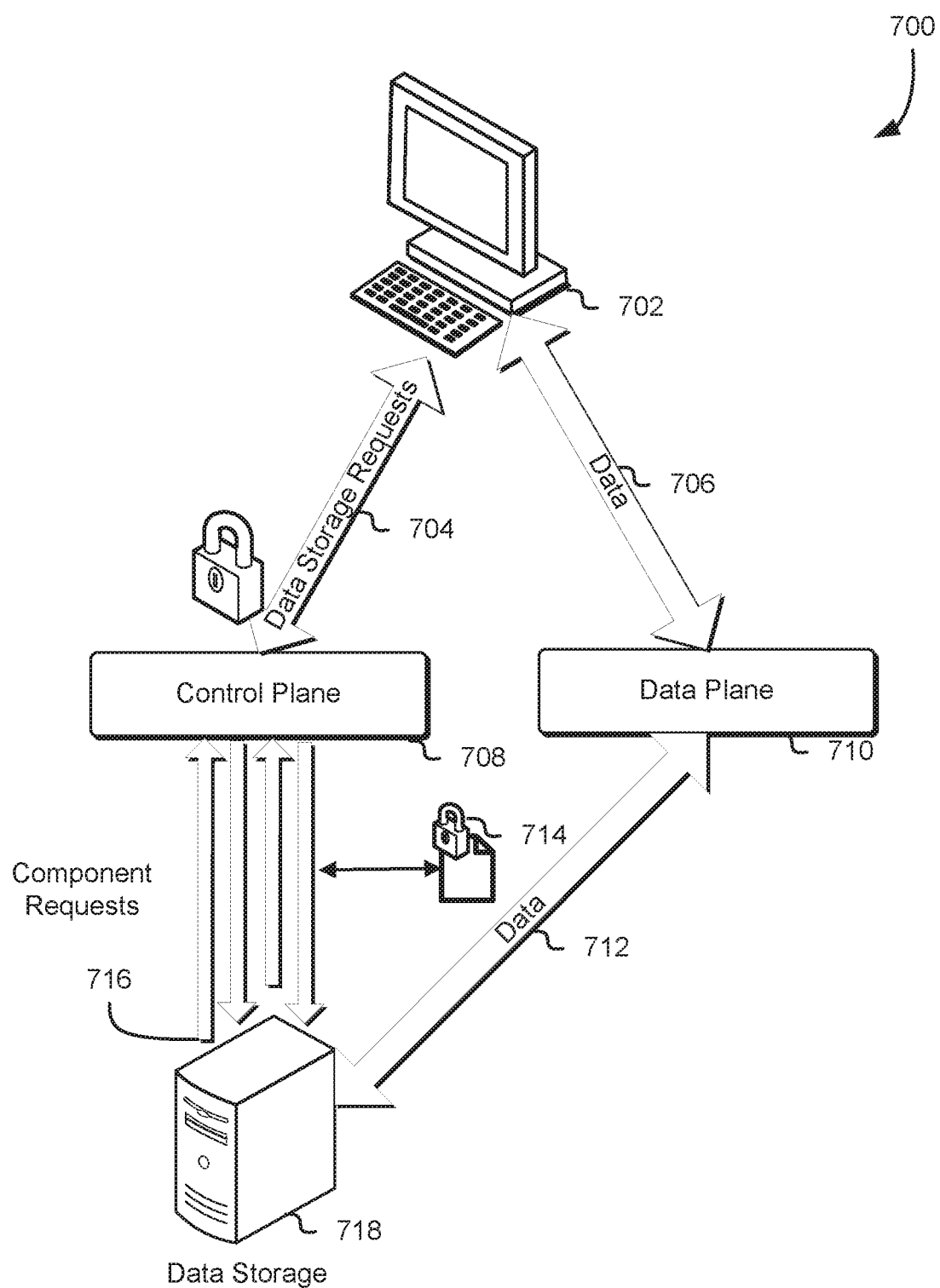
FIG. 7 illustrates an example environment in which disparate entities, such as a control plane and a data plane associated with data storage, process and execute different components of a given set of data storage requests, in accordance with some embodiments.

FIG. 7 illustrates an example environment 700 in which disparate entities, such as a control plane and a data plane associated with data storage, process and execute different components of a given set of data storage requests, in accordance with some embodiments.

In some embodiments, the implementing computing resource service provider may configure the data storage entity 718 to implement a service interface that includes a disparate control plane 708 and data plane 710 so as to further optimize the processing of data storage requests 704, especially in the case where a large number of data storage requests are being processed at any given time.

In the illustrated example, the customer device 702 submits data storage requests 704 to the control plane 708. The data storage requests 704 in the illustrated example may include the file system commands, preferences, and other incidental data and metadata associated with the data storage request but exclude the data payload(s). According to techniques described elsewhere herein, the control plane 708 transacts component requests (e.g., subrequests) 716 with or on behalf of the data storage entity 718 and/or the customer device 702.

Asynchronously or synchronously, the data payload(s) 706 associated with the data storage requests 704 are submitted, by the customer device 702, to the data plane 710, conversely excluding the aforementioned commands, metadata, etc, for transaction 712 with the data storage entity 718. This bifurcation allows the different "streams" to be handled in different ways. For example, the control plane may interact with a requestor using a secure channel, such as via HTTPS (using TLS/SSL), VPN, or other cryptographically secure method, while the data payload, which may itself be encrypted by, e.g., an incident client interface, may be transacted with the data plane 710 (and then on to data storage 718) with less overhead using a less secure channel (e.g., unencrypted HTTP), such as an unencrypted data stream via an unencrypted socket (e.g., a TCP or UDP stream). It is contemplated that commands and/or requests received at the control plane 708 that depend on data 706 that has not yet arrived at the data plane 710 may not be executed until such data 706 has been received 710; conversely, data received at the data plane 710 may not be further processed (e.g., 714) until the associated data storage requests 704 and/or component requests (e.g., subrequests) 716 have been received and/or generated. To regulate and/or otherwise manage the coordination therebetween, a load balancer, queue, or other mechanism may be utilized.

As discussed, numerous variations utilize symmetric and/or asymmetric cryptographic primitives. Symmetric key algorithms may include various schemes for performing cryptographic operations on data including block ciphers, stream ciphers and digital signature schemes. Example symmetric key algorithms include the advanced encryption standard (AES), the data encryption standard (DES), triple DES (3DES), Serpent, Twofish, blowfish, CAST5, RC4, and the international data encryption algorithm (IDEA). Symmetric key algorithms may also include those used to generate output of one way functions and include algorithms that utilize hash-based message authentication codes (HMACs), message authentication codes (MACs) in general, PBKDF2 and Bcrypt. Asymmetric key algorithms may also include various schemes for performing cryptographic operations on data. Example algorithms include those that utilize the Diffie-Hellman key exchange protocol, the digital signature standard (DSS), the digital signature algorithm, the ElGamal algorithm, various elliptic curve algorithms, password-authenticated key agreement techniques, the pallier cryptosystem, the RSA encryption algorithm (PKCS#1), the Cramer-Shoup cryptosystem, the YAK authenticated key agreement protocol, the NTRUEncrypt cryptosystem, the McEliece cryptosystem, and others. Elliptic curve algorithms include the elliptic curve Diffie-Hellman (ECDH) key agreement scheme, the Elliptic Curve Integrated Encryption Scheme (ECIES), the Elliptic Curve Digital Signature Algorithm (ECDSA), the ECMQV key agreement scheme, and the ECQV implicit certificate scheme. Other algorithms and combinations of algorithms are also considered as being within the scope of the present disclosure and the above is not intended to be an exhaustive list.

Figure 8:
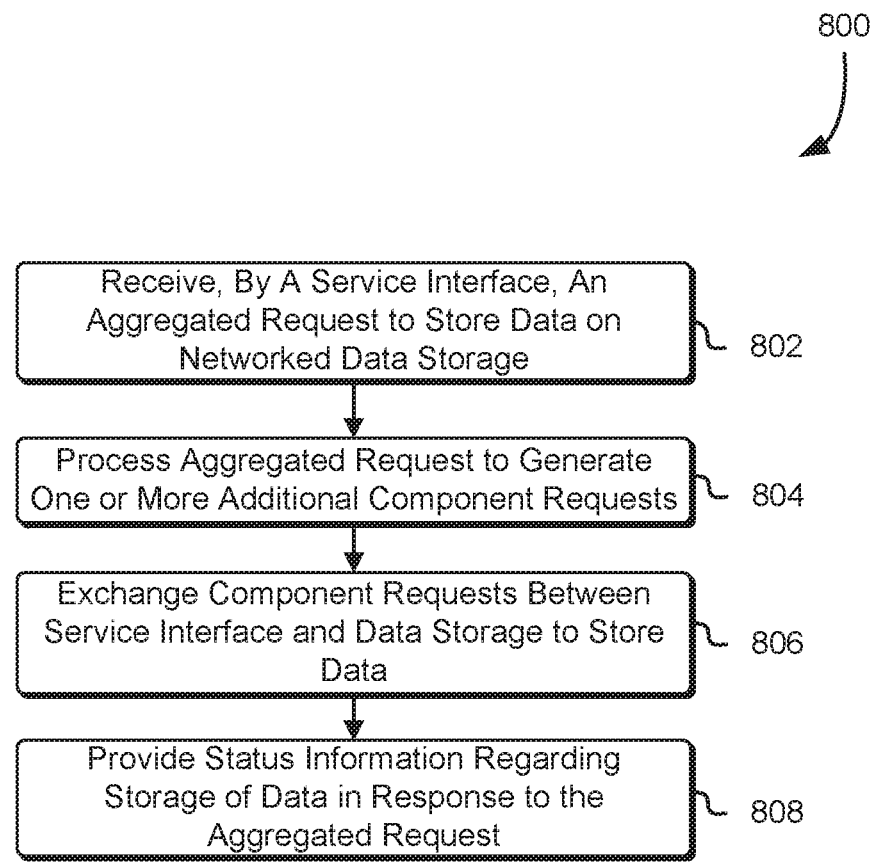
FIG. 8 illustrates an example process in which an aggregated request is processed by an intermediate entity to generate and transact one or more component requests on behalf of a requestor, in accordance with some embodiments.

FIG. 8 illustrates an example process 800 in which an aggregated request is processed by an intermediate entity to generate and transact one or more component requests (e.g., subrequests) on behalf of a requestor, in accordance with some embodiments.

At step 802, an aggregated request to store data on network data storage, such as a data storage system as described elsewhere herein, is received by a service interface implemented by or on behalf of the data storage system. The aggregated request may originate from a customer device connected to the service interface via, e.g., a network, and may include information for fulfilling incident and/or otherwise related component requests (e.g., subrequests) associated with a file system command or similar data storage requests.

At step 804, the aggregated request is processed by the service interface to generate one or more additional component requests (e.g., subrequests), such as the incident/subservient/related component requests just described, or to configure the service interface with responses to such component requests as they are generated by the data storage system. The component requests may be generated as a result of constraints or requirements of a file system implemented on the data storage system.

At step 806, the component requests or subrequests are exchanged between the service interface and the data storage, using the information provided in the aggregated request received in step 802 and processed in step 804. At step 808, status information, such as exception(s) associated with the storage of the data payload on the data storage system, is provided from the data storage system to the service interface, and then made available, e.g., in response to the original aggregated request of step 802, to a requestor (which may be the same or different requestor as/from the requestor in step 802).

Figure 9:
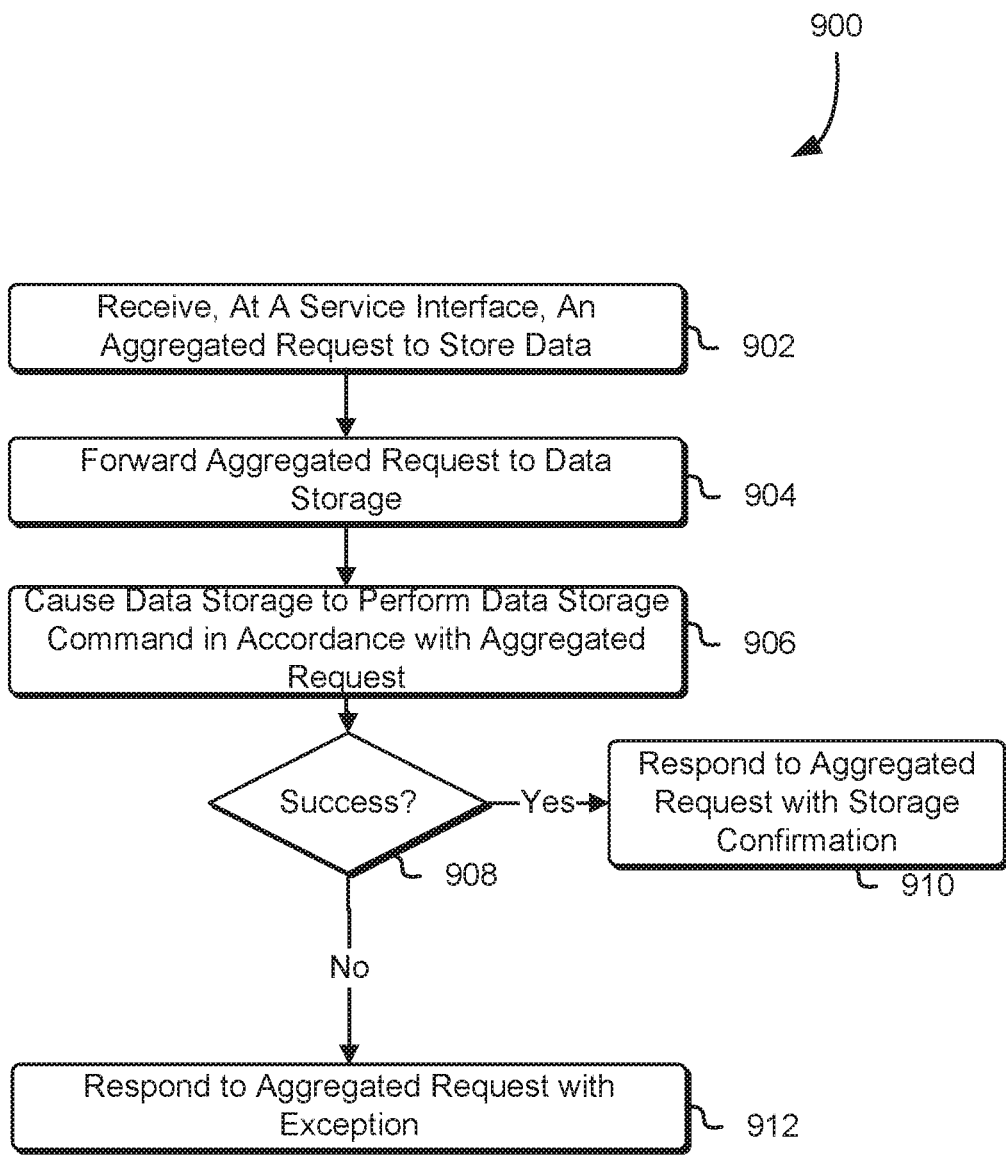
FIG. 9 illustrates an example process in which an aggregated request is directly passed to data storage for execution, in accordance with some embodiments.

FIG. 9 illustrates an example process 900 in which an aggregated request is directly passed to data storage for execution, in accordance with some embodiments.

At step 902, an aggregated request to store data on network data storage, such as a data storage system as described elsewhere herein, is received by a service interface implemented by or on behalf of the data storage system. The aggregated request may originate from a customer device connected to the service interface via, e.g., a network, and may include information for fulfilling incident and/or component requests associated with a file system command or similar data storage requests.

At step 904, the aggregated request is forwarded by the service interface to the data storage so as to, at step 906, cause the data storage to perform one or more data storage or file system commands in accordance with the aggregated request. Any incident file system commands generated by the aggregated request are attempted using the information contained within the aggregated request, and extraneous information contained in the request are ignored or discarded.

If, at decision point 908, the request is successfully executed, status information indicating the success is provided, e.g., back to the service interface to be made available to a requestor, such as the original requestor submitting the aggregated request, at step 910. However, if the request is not successfully executed, an exception is thrown at step 912, and the exception information is provided thereon to the service interface, which may use the exception to automatically retry the command, provide the information regarding the exception to a requestor, or attempt a different command.

Figure 10:
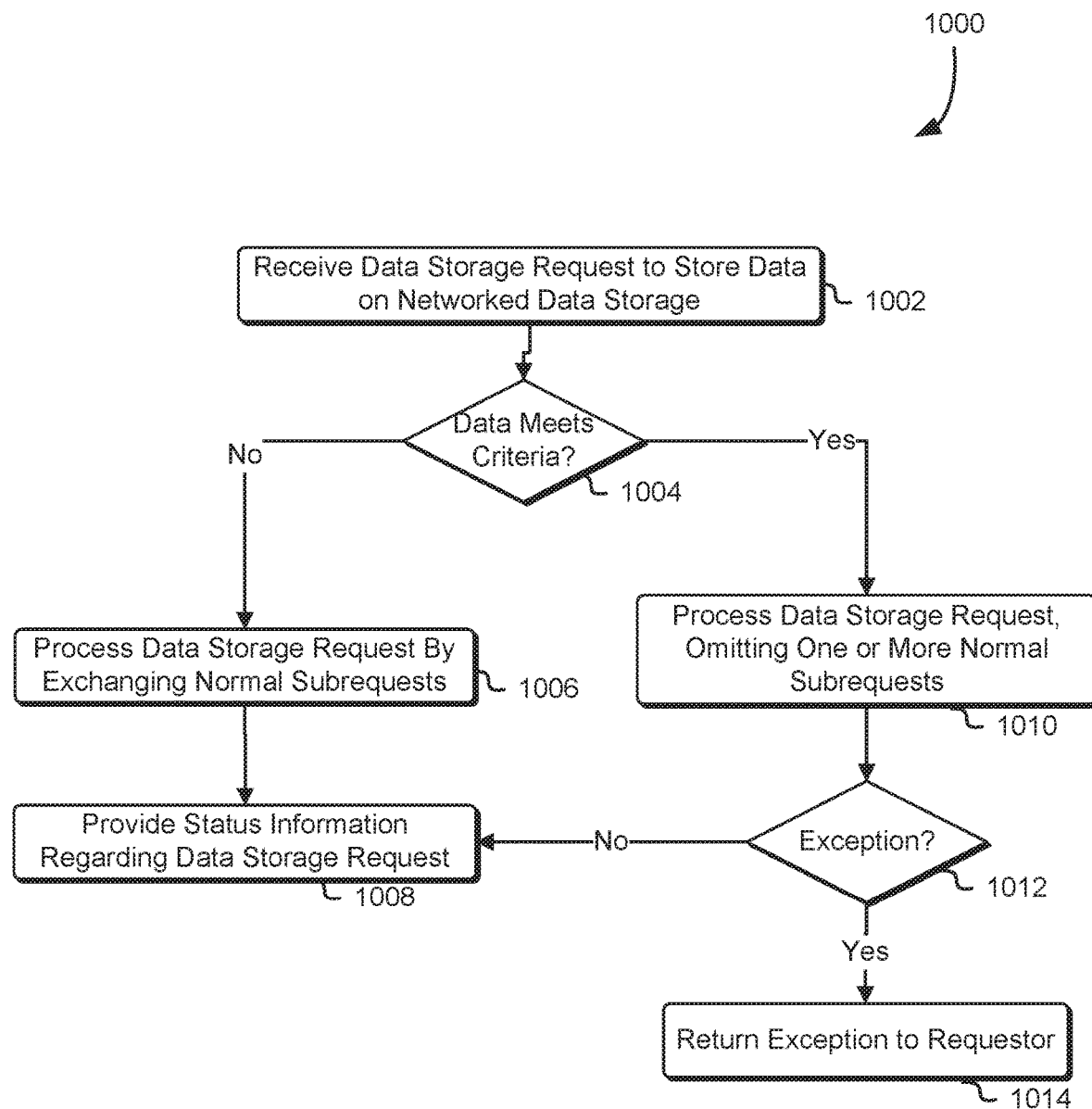
FIG. 10 illustrates an example process in which an entity, such as a service interface, makes determinations regarding aggregation or deaggregation of data storage requests, in accordance with some embodiments.

FIG. 10 illustrates an example process 1000 in which an entity, such as a service interface, makes determinations regarding aggregation or deaggregation of data storage requests, in accordance with some embodiments.

At step 1002, a request to store data on network data storage, such as a data storage system as described elsewhere herein, is received by a service interface implemented by or on behalf of the data storage system. The request may originate from a customer device connected to the service interface via, e.g., a network, and may include information for fulfilling incident and/or component requests associated with a file system command or similar data storage requests.

At decision point 1004, the service interface determines whether the data payload associated with the request meets one or more criteria, e.g., file size threshold. If it does not, the data storage request is processed in a specified fashion at step 1006, such as by generating and forwarding subrequests/component requests to the service interface and/or the customer device, as prescribed by the implemented file system. Information regarding the execution of these requests is provided to the service interface, and, e.g., thereon to a requestor, at step 1008.

However, if at decision point 1004 the service interface determines that the data payload does meet the specified criteria, the service interface causes the data storage to process the data storage request using a reduced set of component requests at step 1010. If, at decision point 1012, these operations cause the data storage to throw an exception, the resultant exception is provided to the service interface, which may use the exception to automatically retry the command, provide the information regarding the exception to a requestor 1014, or attempt a different command. However, if no exception is thrown, status information, such as success or confirmation of storage of the data payload, is provided at step 1008.

Figure 11:
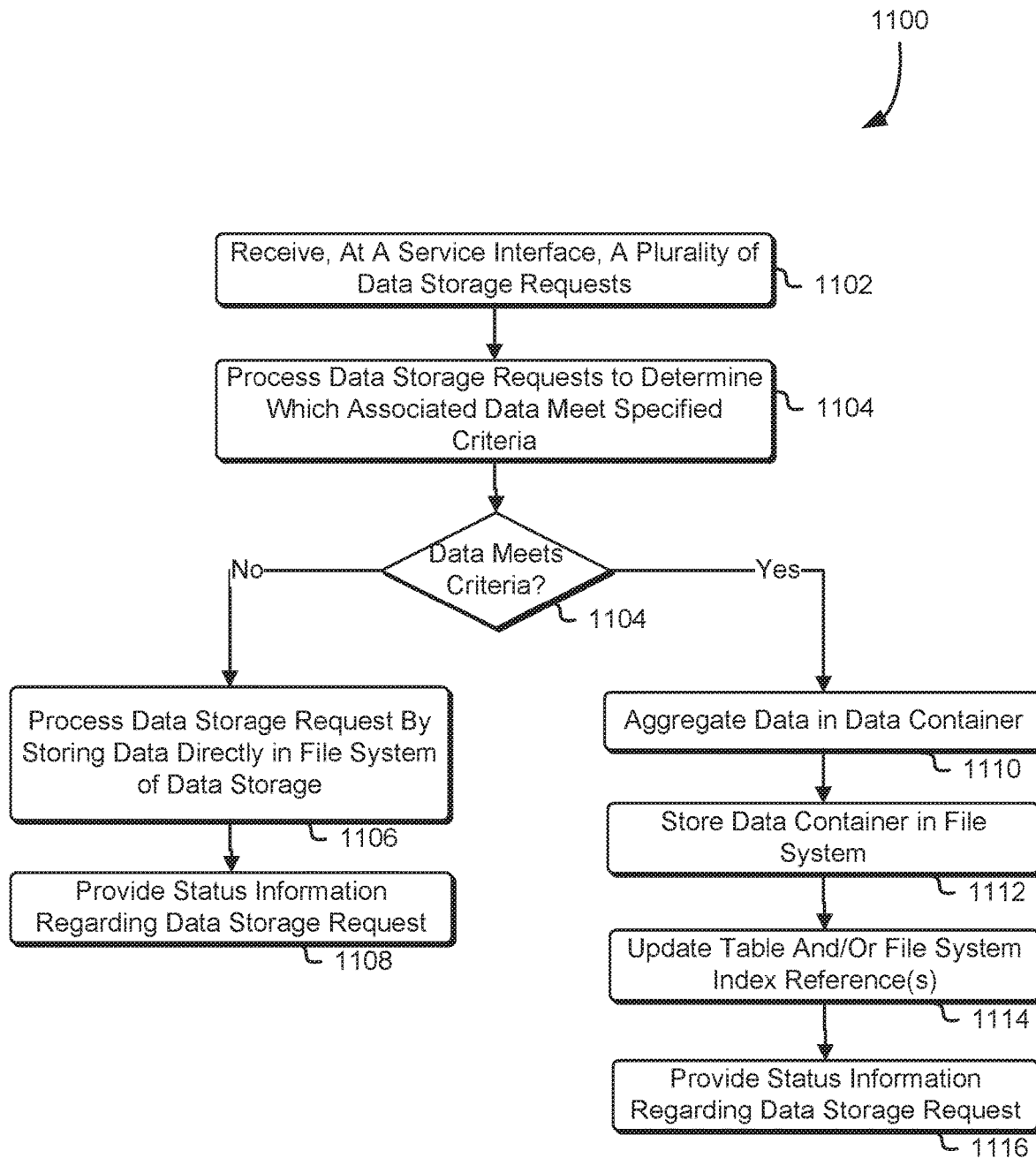
FIG. 11 illustrates an example process in which an entity, such as a service interface, makes determinations regarding aggregation of data payloads into data containers to be stored in data storage, in accordance with some embodiments.

FIG. 11 illustrates an example process 1100 in which an entity, such as a service interface, makes determinations regarding aggregation of data payloads into data containers to be stored in data storage, in accordance with some embodiments.

At step 1102, a plurality of requests to store data on network data storage, such as a data storage system as described elsewhere herein, is received by a service interface implemented by or on behalf of the data storage system. The requests may originate from a plurality of customer devices connected to the service interface via, e.g., a network, and may include information for fulfilling incident and/or component requests associated with a file system command or similar data storage requests.

At step 1104, the service interface processes the data storage requests to determine which requests, if any, include data objects in their respective payloads meets one or more criteria, e.g., file size threshold. If, at decision point 1104, the criteria are not met by a subset, at step 1106, those data storage requests are directly executed such that the objects in the data payload are stored directly in an implemented file system of the data storage system. For example, if the aforementioned objects are larger than a given threshold that triggers aggregation step 1110 described later herein, they are subject to direct processing according to step 1106. Information regarding the fulfillment of the requests is provided at step 1108 by the data storage system to the service interface, and thereon to a requestor.

However, if at decision point 1104 the criteria are met by at least a subset of the associated data, at step 1110, the service interface aggregates the associated data in a data container, such as that described above. The data container is stored in the file system as a unitary object at step 1112, and may include reference to a mapping table that identifies the files within the container as well as their relative offsets and/or locations within the container. This mapping table is updated, as well as an index associated with the parent file system, at step 1114, by, e.g., the data storage system as part of the storage processing mechanism employed therewith (e.g., the file system operation(s)). To whatever extent status information is provided through steps 1110, 1112, and 1114, such status information is provided back to the service interface at step 1116 (and thus, on to a requestor).

Figure 12:
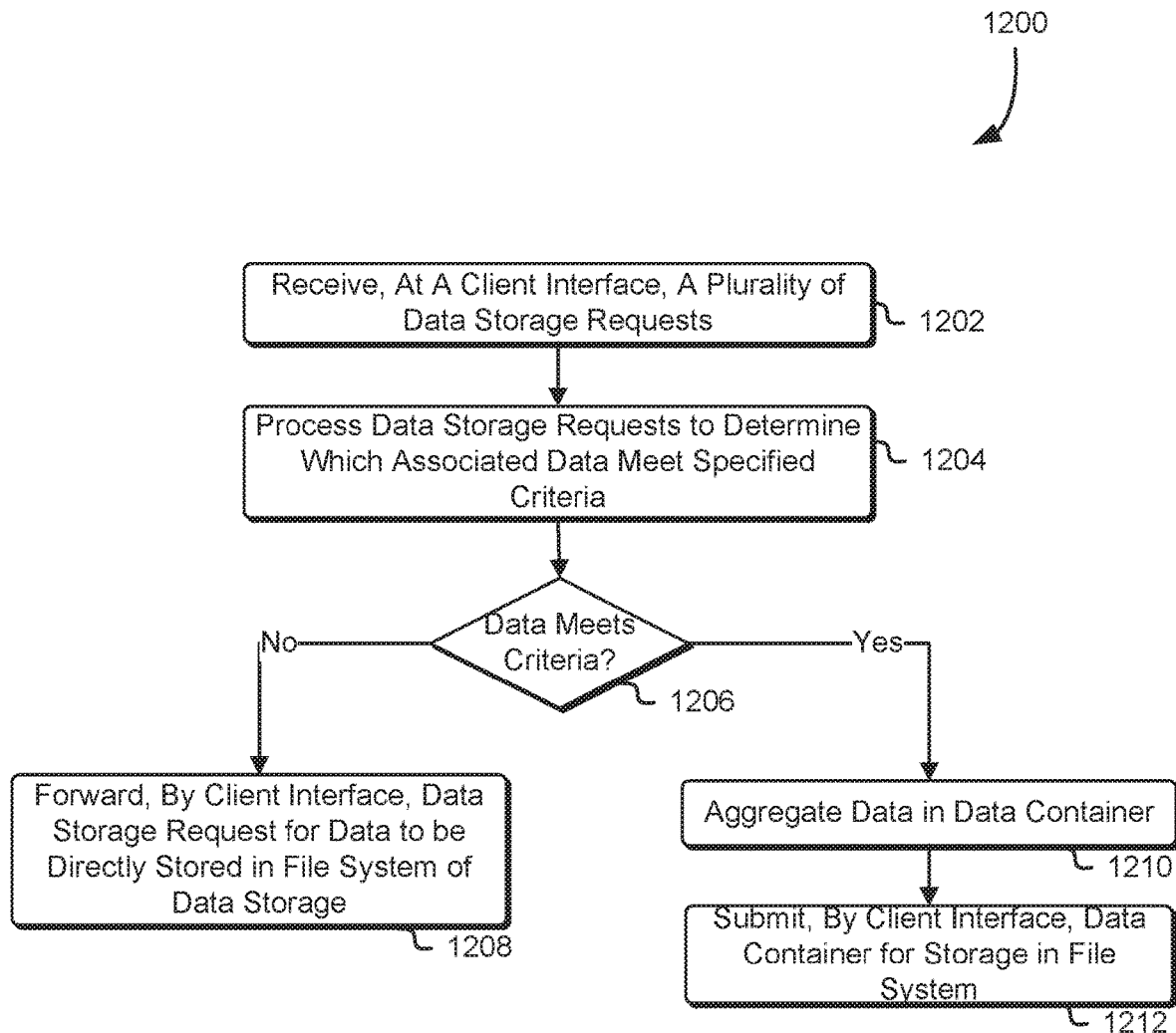
FIG. 12 illustrates an example process in which a client interface makes determinations regarding data payload aggregation into data containers for transaction with data storage, in accordance with some embodiments.

FIG. 12 illustrates an example process 1200 in which a client interface makes determinations regarding data payload aggregation into data containers for transaction with data storage, in accordance with some embodiments.

At step 1202, a plurality of requests to store data on network data storage, such as a data storage system as described elsewhere herein, is received by a client interface on a customer device. The requests may include information for fulfilling incident and/or component requests associated with a file system command or similar data storage requests.

At step 1206, the client interface processes the data storage requests to determine which requests, if any, include data objects in their respective payloads meets one or more criteria, e.g., file size threshold. If, at decision point 1204, the criteria are not met by a subset, at step 1208, those data storage requests are directly forwarded such that the objects in the data payload are stored directly in an implemented file system of the data storage system. For example, if the aforementioned objects are larger than a given threshold that triggers aggregation step 1210 described later herein, they are subject to direct processing according to step 1208.

However, if at decision point 1204 the criteria are met by at least a subset of the associated data, at step 1210, the client interface aggregates the associated data in a data container, such as that described above. The data container is associated with a data storage request generated by the client interface for storage in the file system of a data storage system as a unitary object at step 1212. As with the example given in FIG. 11, the request and/or the data container may include reference to a mapping table that identifies the files within the container as well as their relative offsets and/or locations within the container.

Figure 13:
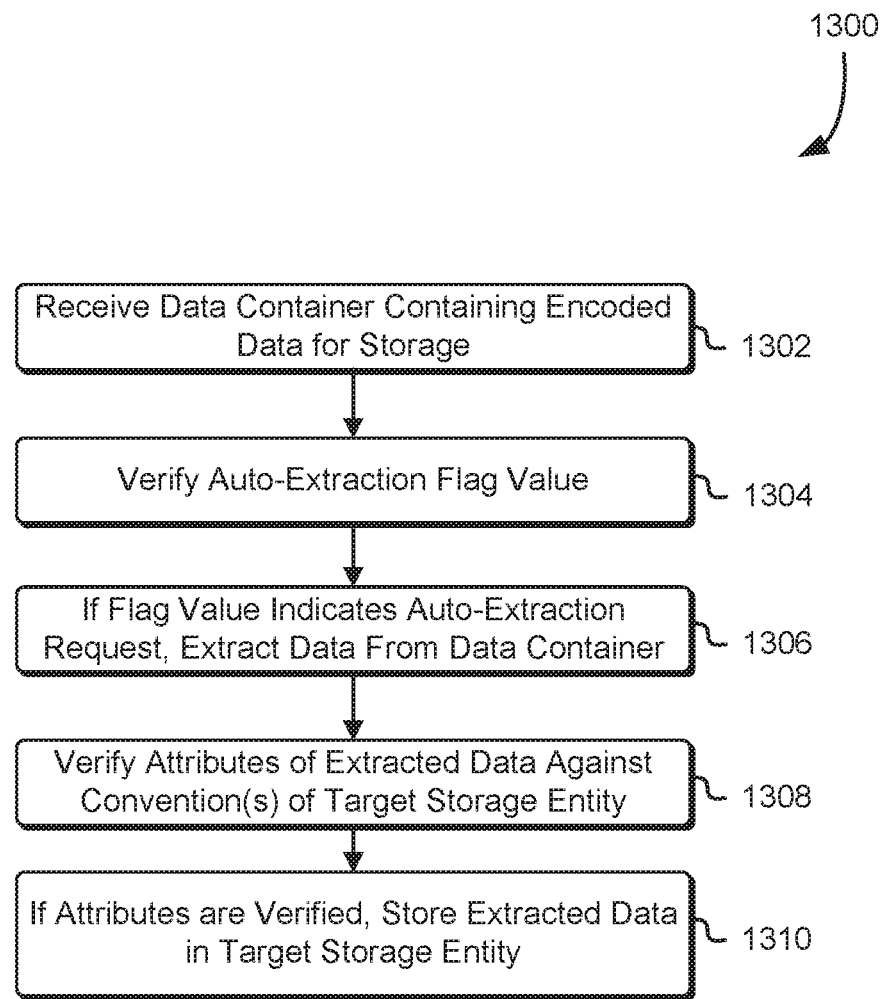
FIG. 13 illustrates an example process in which a system, such as a data storage system, makes determinations regarding processing of data payload, a subset of which includes data containers containing data to be stored in the system, in accordance with some embodiments.

FIG. 13 illustrates an example process 1300 in which a system, such as a data storage system, makes determinations regarding processing of data payload, a subset of which includes data containers containing data to be stored in the system, in accordance with some embodiments.

At step 1302, a data container, such as that described elsewhere herein, containing encoded data is received by a service interface for storage on an associated data storage system. As previously mentioned, the data may be compressed, archived, or both. At step 1304, the service interface determines whether the data payload is, in fact, a container rather than an object to be further processed according to the process described in this FIG. 13, such as by verifying the presence of an "auto-extract" flag within the data container or within the associated data storage request.

At step 1306, if the service interface determines that the payload is a data container, the data contained within the data container is extracted by the service interface and, at step 1308, verified so as to ascertain the data's integrity and semantic compatibility with one or more conventions or constraints imposed by the target storage entity (e.g., the data storage system, a file system associated therewith, or that of a larger archival data storage system for which the data is eventually destined). At step 1310, if the attributes are verified, the extracted data is forwarded to the target storage entity for further processing and storage.

Figure 14:
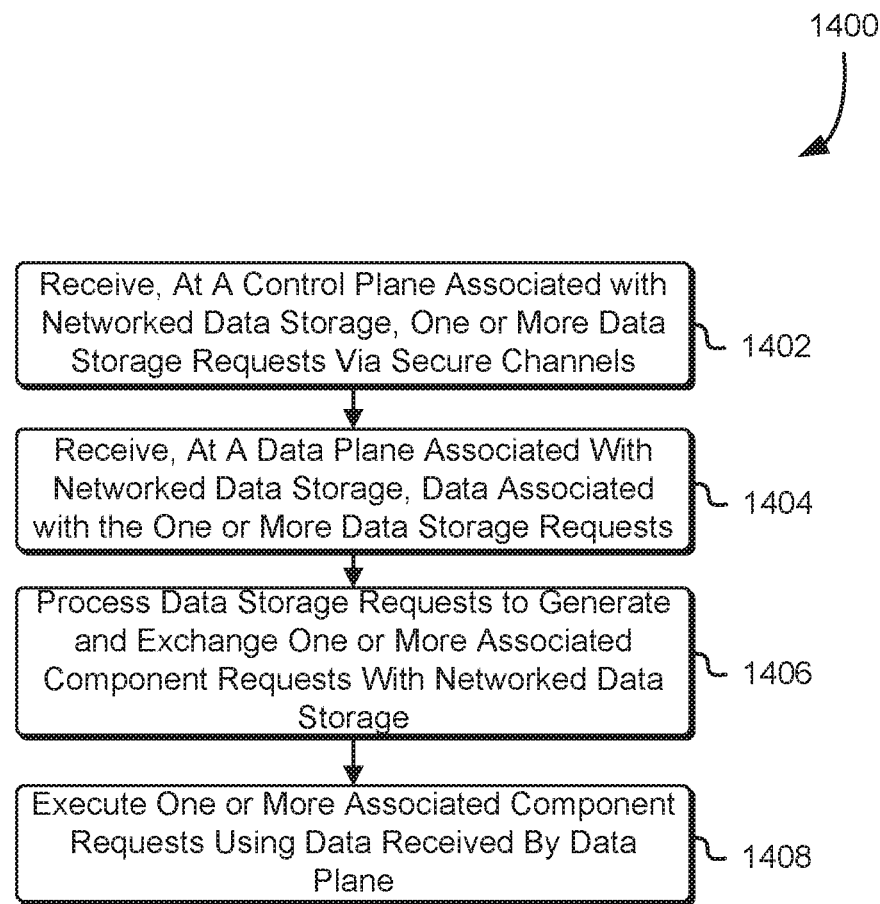
FIG. 14 illustrates an example process in which a system, such as a data storage system, processes different components of a data storage request via a disparate control plane and data plane, in accordance with some embodiments.

FIG. 14 illustrates an example process 1400 in which a system, such as a data storage system, processes different components of a data storage request via a disparate control plane and data plane, in accordance with some embodiments.

At step 1402, a control plane of a service interface, such as an interface implemented by or on behalf of a data storage entity, receives one or more data storage requests via, e.g., cryptographically secure channels, such as encrypted VPN, HTTPS (SSL/TLS), and the like. These data storage requests, as explained elsewhere herein, omit the data payload but include all other incidental metadata identifying and fulfilling the operations requested.

At step 1404, synchronously or asynchronously relative to the execution of step 1402, the data payload is received by a data plane of the service interface. The data payload may be any data or data container as described elsewhere herein, and, in some embodiments, may be cryptographically secured (i.e., encrypted) using one or more cryptographic primitives. As such, the channel used for the requestor to submit the data to the data plane may be less secure than that of the control plane.

At step 1406, the data storage requests received at the control plane are processed so as to determine which data and/or metadata is sufficient to fulfill those requests, e.g., component requests and the like, and at step 1408, the data received in step 1404 is used to execute and fulfill those data storage requests and associated component requests. As previously mentioned, the coordination of the data plane and the control plane may be aided by implementation of a load balancer, a queue, or one or more other similar entities.

Figure 15:
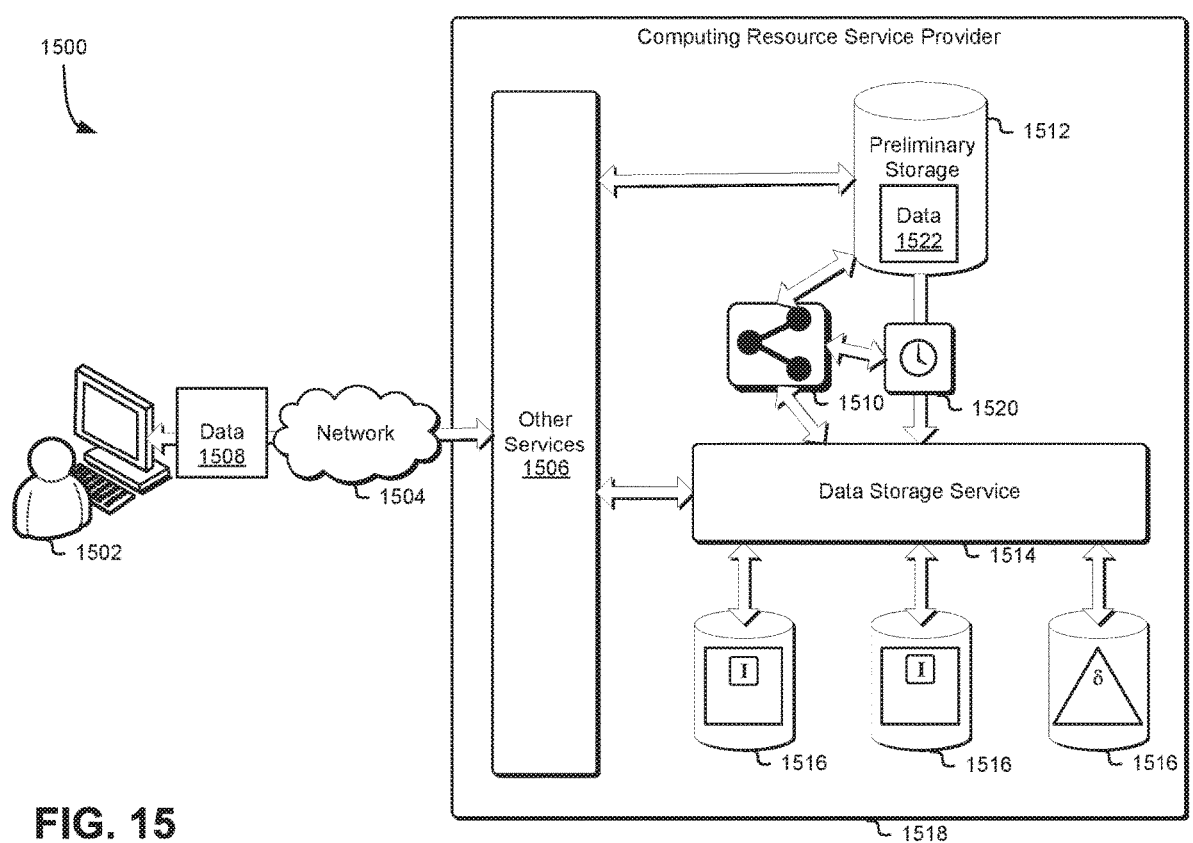
FIG. 15 illustrates an example environment in which a computing resource service provider implements a data storage service, such as a grid storage service, to process and store data transacted therewith, in accordance with some embodiments.

FIG. 15 illustrates an example environment 1500 in which a computing resource service provider implements a data storage service, such as a grid storage service, to process and store data transacted therewith, in accordance with some embodiments.

A customer, via a customer device 1502, may connect via a network 1504 to one or more services 1506 provided by a computing resource service provider 1518. In some embodiments, the computing resource service provider 1518 may provide a distributed, virtualized, and/or datacenter environment within which one or more applications, processes, services, virtual machines, and/or other such computer system entities may be executed. In some embodiments, the customer may be a person, or may be a process running on one or more remote computer systems, or may be some other computer system entity, user, or process. The customer device 1502 and the network 1504 may be similar to that described in connection with at least FIG. 1 above.

The command or commands to connect to the computer system instance may originate from an outside computer system and/or server, or may originate from an entity, user, or process on a remote network location, or may originate from an entity, user, or process within the computing resource service provider, or may originate from a user of the customer device 1502, or may originate as a result of an automatic process or may originate as a result of a combination of these and/or other such origin entities. In some embodiments, the command or commands to initiate the connection to the computing resource service provider 1518 may be sent to the services 1506, without the intervention of the user of the services 1506. The command or commands to initiate the connection to the services 1506 may originate from the same origin as the command or commands to connect to the computing resource service provider 1518 or may originate from another computer system and/or server, or may originate from a different entity, user, or process on the same or a different remote network location, or may originate from a different entity, user, or process within the computing resource service provider, or may originate from a different user of the customer device 1502, or may originate as a result of a combination of these and/or other such same and/or different entities.

The customer device 1502 may request connection to the computing resource service provider 1518 via one or more connections and, in some embodiments, via one or more networks 1504 and/or entities associated therewith, such as servers connected to the network, either directly or indirectly. The customer device 1502 that requests access to the services 1506 may, as previously discussed, include any device that is capable of connecting with a computer system via a network, including at least servers, laptops, mobile devices, such as smartphones or tablets, other smart devices such as smart watches, smart televisions, set-top boxes, video game consoles, and other such network-enabled smart devices, distributed computer systems and components thereof, abstracted components such as guest computer systems or virtual machines and/or other types of computing devices and/or components. The network 1504, also as previously discussed, may include, for example, a local network, an internal network, a public network such as the Internet, or other networks such as those listed or described herein. The network may also operate in accordance with various protocols such as those listed or described herein.

The computing resource service provider 1518 may provide access to one or more host machines as well as provide access to services such as virtual machine (VM) instances, automatic scaling groups, or file-based database storage systems as may be operating thereon. The services 1506 may connect to or otherwise be associated with one or more storage services such as those described herein (e.g., the data storage service 1514). The storage services may be configured to provide data storage for the services 1506. In an embodiment, the computing resource service provider 1518 may provide direct access to the one or more storage services for use by users and/or customers of the computing resource service provider. The storage services may manage storage of data on one or more block storage devices and/or may manage storage of data on one or more archival storage devices such as, for example, magnetic tapes.

For example, the computing resource service provider 1518 may provide a variety of services 1506 to the customer device 1502, which may in turn communicate with the computing resource service provider 1518 via an interface, which may be a web service interface, application programming interface (API), user interface, or any other type of interface. The services 1506 provided by the computing resource service provider 1518 may include, but may not be limited to, a virtual computer system service, a block-level data storage service, a cryptography service, an on-demand data storage service, a notification service, an authentication service, a policy management service, an archival storage service, a durable data storage service such as the data storage service 1514, and/or other such services. Each of the services 1506 provided by the computing resource service provider 1518 may include one or more web service interfaces that enable the customer device 1502 to submit appropriately configured API calls to the various services through web service requests. In addition, each of the services may include one or more service interfaces that enable the services to access each other (e.g., to enable a virtual computer system of the virtual computer system service to store data in or retrieve data from the on-demand data storage service or the data storage service 1514, and/or to access one or more block-level data storage devices provided by the block-level data storage service).

The block-level data storage service may comprise one or more computing resources that collectively operate to store data for a user using block-level storage devices (and/or virtualizations thereof). The block-level storage devices of the block-level data storage service may, for example, be operationally attached to virtual computer systems provided by a virtual computer system service to serve as logical units (e.g., virtual drives) for the computer systems. A block-level storage device may enable the persistent storage of data used or generated by a corresponding virtual computer system where the virtual computer system service may be configured to only provide ephemeral data storage.

The computing resource service provider 1518 may also include an on-demand data storage service. The on-demand data storage service may be a collection of computing resources configured to synchronously process requests to store and/or access data. The on-demand data storage service may operate using computing resources (e.g., databases) that enable the on-demand data storage service to locate and retrieve data quickly, to allow data to be provided in response to requests for the data. For example, the on-demand data storage service may maintain stored data in a manner such that, when a request for a data object is retrieved, the data object can be provided (or streaming of the data object can be initiated) in a response to the request. As noted, data stored in the on-demand data storage service may be organized into data objects. The data objects may have arbitrary sizes except, perhaps, for certain constraints on size. Thus, the on-demand data storage service may store numerous data objects of varying sizes. The on-demand data storage service may operate as a key value store that associates data objects with identifiers of the data objects that may be used by the user to retrieve or perform other operations in connection with the data objects stored by the on-demand data storage service.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

The services 1506 may produce data, such as data 1508 received from the customer device 1502, which may be stored 1522 in the preliminary storage 1512 as described above. In some embodiments, as previously mentioned, the data stored in the preliminary storage may be stored in unaltered form, such as in an identity shard. While the data is stored in the preliminary storage 1512, the data 1522 may be accessed by the services 1506 (e.g., as a result of one or more API requests by the customer device 1502) from the preliminary storage 1512. After a determined period 1520, such as described above in connection with FIG. 1, has passed and the data is migrated to a data storage service 1514 provided by the computing resource service provider 1518, the data may be accessed using the data storage service 1514. In an embodiment where the data may be stored using redundancy encoding technique such as those described herein, the data storage service 1514 may retrieve the data from any of the data volumes 1516 and/or may reconstruct the data using the redundancy encoding techniques. The data volumes 1516 may be magnetic tape, may be optical disks, or may be some other such storage media. As previously discussed and as further discussed herein, the data may be stored in identity shards that correspond individually to volumes, and may also be processed (using the redundancy encoding techniques) so as to create derived shards.

The data storage service 1514 may store the data 1522 in the preliminary storage 1512 or may transmit a command that causes a different service (e.g., a block storage service or some other storage service such as those described herein) to store the data 1522 in the preliminary storage 1512. The data storage service 1514 may also cause the data to be migrated from the preliminary storage 1512 or may transmit a command that causes a different service to cause the data to be migrated from the preliminary storage 1512. The data storage service 1514 may also transmit a command or commands to cause a different service to perform other operations associated with making data objects eventually durable including, but not limited to, storing the data objects in the data shards, calculating derived shards, updating bundles, updating grids (i.e., updating horizontal, vertical, and other bundles of multiply bundled data), and/or other such operations.

In an embodiment, the preliminary storage 1512 is a data storage volume such as, for example, a magnetic disk drive (e.g., a spinning disk drive or a solid state disk drive), computer system memory, magnetic tape, or some other optical storage device. In another embodiment, the preliminary storage 1512 is a virtual and/or shared data storage volume that is mapped to a physical storage volume such as, for example, a disk drive, a solid state disk drive, computer system memory, magnetic tape, or some other optical storage device. As may be contemplated, the types of data storage volumes used for the preliminary storage 1512 described herein are illustrative examples and other types of data storage volumes used for the preliminary storage 106 may be considered as within the scope of the present disclosure.

In an embodiment, the preliminary storage 1512 is a plurality of storage devices that are used to redundantly store the data using techniques such as, for example, bundle encoding, grid encoding, or replicated storage. For example, the preliminary storage 1512 may store the data by distributing the data to a plurality of data shards (e.g., putting a first portion of the data in a first data shard and a second portion of the data in a second data shard) and generating one or more derived shards based on those data shards. In another embodiment, the preliminary storage 1512 is one or more storage devices that store redundant copies of the data as received. In yet another embodiment, the preliminary storage uses a combination of the storage techniques described herein by, for example, storing a single copy of the data for a first time period (e.g., thirty minutes), storing multiple copies of the data for a second time period (e.g., one day), using redundant storage techniques such as grid or bundle encoding to store the data for a third time period (e.g., thirty days), and then moving the data to more durable storage 1516 using the data storage service 1514 as described herein.

The set of data may be stored in the preliminary storage 1512 in an unaltered form (e.g., not processed, compressed, indexed, or altered prior to storage). The set of data may also be stored in the preliminary storage 1512 as, for example, original data (also referred to herein as an "identity shard") such as the original data shards described herein. In an embodiment, the set of data stored in the preliminary storage 1512 is stored without indexing and without any redundancy encoding. In another embodiment, the set of data stored in the preliminary storage 1512 is stored with null redundancy encoding (i.e., a redundancy encoding that maps the data to itself). The data in preliminary storage may be stored as raw data, or may be bundle-encoded, or may be grid-encoded, or may be stored using some other method.

In an embodiment, data can be migrated from preliminary storage to the data storage service 1512 as a result of an event such as, for example, a request by a customer to store the data in the data storage service 1514. Other events may also be used to cause the migration of the data from preliminary storage 1512 to the data storage service 1514 such as, for example, events generated by a process, module, service, or application associated with the customer or associated with a computing resource service provider. In an illustrative example, a block storage service may maintain data storage in preliminary storage for a running virtual machine instance and, upon termination of the instance, may generate an event to migrate some or all of the data from preliminary storage to durable storage. The triggering event that causes the migration of data from preliminary storage may also be combined with an elapsed time as described above so that, for example, data may be stored in preliminary storage until an event occurs, but the data may also be migrated from preliminary storage if no event occurs prior to the elapsed time. As may be contemplated, the criteria for initiating the migration from preliminary storage described herein are illustrative examples and other such criteria for initiating the migration from preliminary storage may be considered as within the scope of the present disclosure.

As used herein, the durability of a data object may be understood to be an estimate of the probability that the data object will not unintentionally become permanently irretrievable (also referred to herein as "unavailable"). This durability is an estimated probability and is generally expressed as a percentage (e.g., 99.9999 percent). This durability is based on assumptions of probabilities of certain failures (e.g., the AFR of drives used to store the data) and may be based on an average failure rate, a maximum failure rate, a minimum failure rate, a mean failure rate, or some other such failure rate. The durability may be based on a statistical average of the failure over a collection of drives when there are many different drives and/or when there are many different types of drives. The durability may also be based on historical measurements of the failure of drives and/or statistical sampling of the historical measurements of the failure of drives. The durability may also be correlated with the probability that a data object will not unintentionally become unavailable such as, for example, basing the durability on the probability that a data object will unintentionally become unavailable. As may be contemplated, the methods of determining durability of data described herein are merely illustrative examples and other such methods of determining durability of data may be considered as within the scope of the present disclosure.

In an embodiment, a separate service 1510 can be configured to monitor the elapsed time 1520 associated with the data objects in preliminary storage 1512 and, based on a desired durability, cause the data storage service 1514 to initiate migration of the data objects from the preliminary storage 1512 to the durable storage by, for example, transmitting a message to the data storage service. This separate service may operate asynchronously to enforce time limits for all such data stored in preliminary storage.

Figure 16:
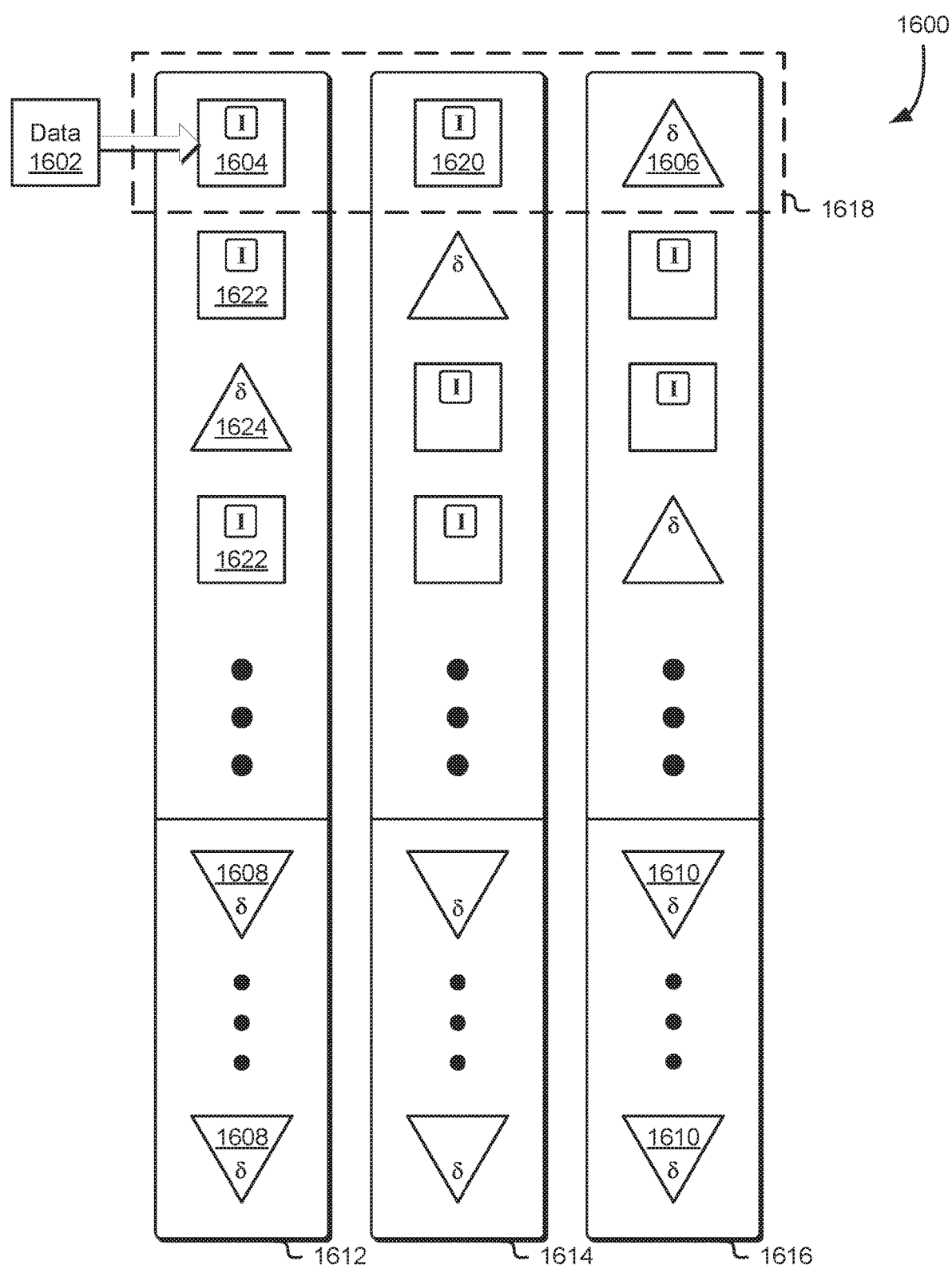
FIG. 16 illustrates an example environment where a redundancy encoding technique is applied to data stored in durable storage in accordance with at least one embodiment.

FIG. 16 illustrates an example environment 1600 where a redundancy encoding technique is applied to data stored in durable storage as described and in accordance with an embodiment. The redundancy encoding technique illustrated in FIG. 16 is an example of a grid encoding technique wherein each identity shard is part of a first set of one or more identity shards which may be bundled with one or more derived shards in a first group or bundle (i.e., in one dimension or direction) and each identity shard is also part of at least a second set of one or more identity shards which may be bundled with one or more other derived shards in a second bundle or group (i.e., in a second dimension or direction). As is illustrated in FIG. 16, a grid encoding technique is often implemented as a two-dimensional grid, with each shard being part of two bundles (i.e., both "horizontal" and "vertical" bundles). However, a grid encoding technique may also be implemented as a three-dimensional grid, with each shard being part of three bundles, or a four-dimensional grid, with each shard being part of four bundles, or as a larger-dimensional grid. Additional details of grid encoding techniques are described in U.S. patent application Ser. No. 14/789,783, filed Jul. 1, 2015, entitled "GRID ENCODED DATA STORAGE SYSTEMS FOR EFFICIENT DATA REPAIR", which is incorporated by reference herein.

In the example illustrated in FIG. 16, data 1602 from preliminary storage is provided for storage in durable storage using a redundancy encoding technique with both horizontal derived shards and vertical derived shards. In the example illustrated in FIG. 16, a first datacenter 1612 may contain data shards (denoted as a square shard with the letter "I"), horizontal derived shards (denoted as a triangular shard with the Greek letter "δ" or delta), and vertical derived shards (denoted as an inverted triangle with the Greek letter "δ") all of which may be stored on durable storage volumes within the first datacenter 1612. A second datacenter 1614, which may be geographically and/or logically separate from the first datacenter 1612, may also contain data shards, horizontal derived shards, and/or vertical derived shards. A third datacenter 1616, which may be geographically and/or logically separate from the first datacenter 1612 and from the second datacenter 1614, may also contain data shards, horizontal derived shards, and/or vertical derived shards. As illustrated in FIG. 16, each of the three datacenters may be a single vertical bundle. In an embodiment, each of the datacenters can include multiple vertical bundles. As may be contemplated, the number of datacenters illustrated in FIG. 16 and/or the composition of the datacenters illustrated in FIG. 16 are merely illustrative examples and other numbers and/or compositions of datacenters may be considered as within the scope of the present disclosure. The datacenters may be co-located or may be located in one or more separate datacenter locations.

In the example illustrated in FIG. 16, the data 1602 may be copied to a data shard 1604 and, as a result of the change to the data in the data shard 1604, a horizontal derived shard 1606 associated with the data shard 1604 may be updated so that the horizontal derived shard 1606 may be used to reconstruct the data shard 1604 in the event of a loss of the data shard 1604. In the example illustrated in FIG. 16, the three shards enclosed by the dotted line (e.g., the data shard 1604, the data shard 1620, and the horizontal derived shard 1606) are a horizontal bundle 1618. In this example, the data shard 1620 is not affected by the changes to the data shard 1604 but the horizontal derived shard 1606 may need to be updated as a result of the changes to the data shard 1604.

Also as a result of the change to the data in the data shard 1604, one or more vertical derived shards 1608 related to the data shard 1604 may also be updated so that the vertical derived shards 1608 may be used to reconstruct the data shard 1604 in the event of a loss of the data shard 1604 and the horizontal derived shard 1606. In the example illustrated in FIG. 16, the shards in datacenter 1612 form a vertical bundle. In this example, the other data shards 1622 in the vertical bundle and/or the horizontal derived shards 1624 in the vertical bundle are not affected by the changes to the data shard 1604 but the vertical derived shards 1608 may need to be updated as a result of the changes to the data shard 1604. Finally, as a result of the change to the horizontal derived shard 1606, one or more vertical derived shards 1610 related to the horizontal derived shard 1606 in the vertical bundle in datacenter 1616 may also be updated so that the vertical derived shards 1610 may be used to reconstruct the horizontal derived shard 1606 in the event of a loss of the horizontal derived shard 1606 and the data shard 1604.

Figure 17:
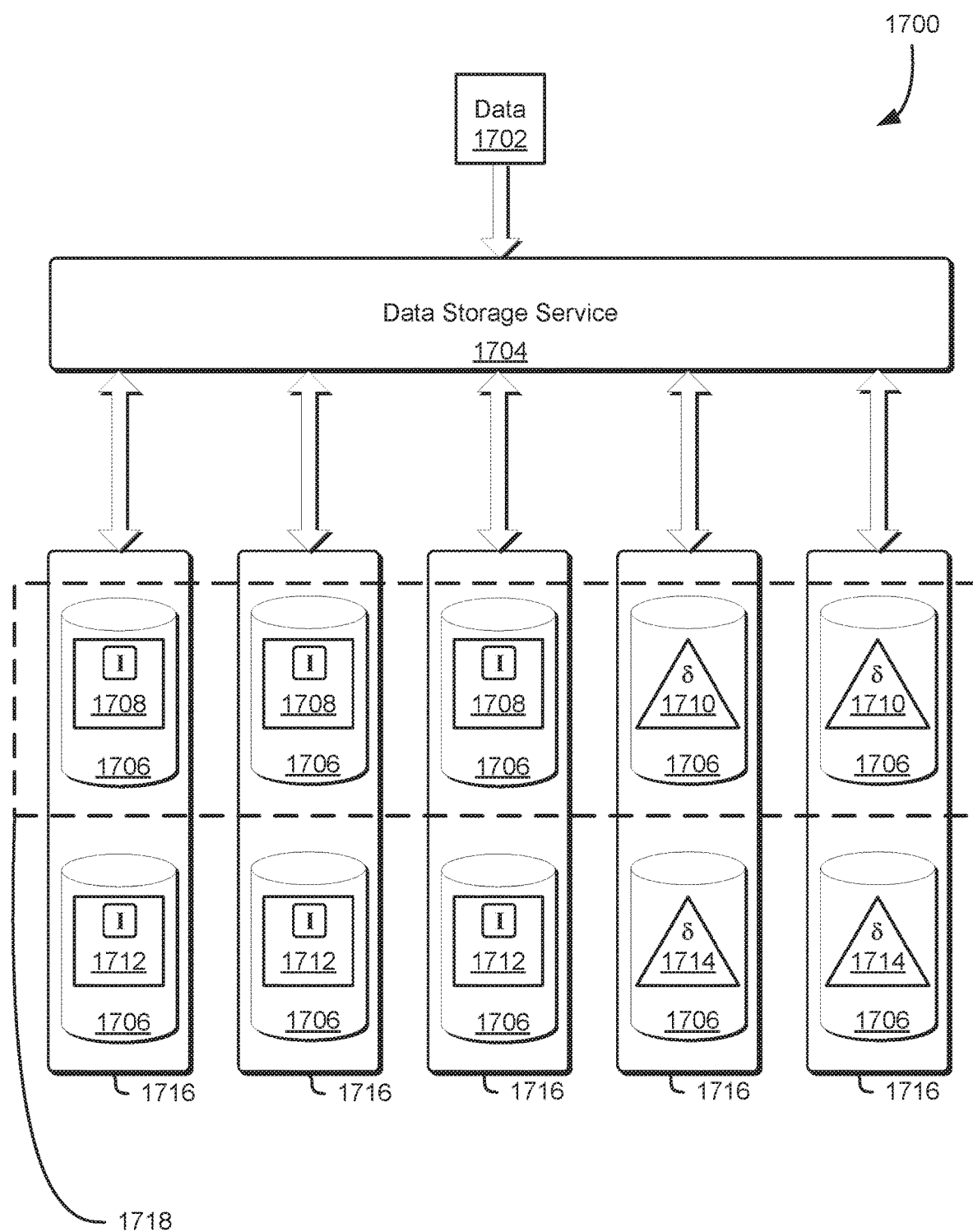
FIG. 17 illustrates an example environment where a redundancy encoding technique is applied to data stored in durable storage in accordance with at least one embodiment.

FIG. 17 illustrates an example environment 1700 where a redundancy encoding technique is applied to data stored in durable storage and in accordance with at least one embodiment. The redundancy encoding technique illustrated in FIG. 17 is an example of a bundle encoding technique wherein one or more identity shards (also referred to herein as "data shards") may be bundled with one or more derived shards in a single group or dimension. Additional details of bundle encoding techniques are described in U.S. patent application Ser. No. 14/741,409, filed Jun. 16, 2015, entitled "ADAPTIVE DATA LOSS MITIGATION FOR REDUNDANCY CODING SYSTEMS", which is incorporated by reference herein.

Data 1702 from preliminary storage may be sent to a data storage system 1704 for redundant storage. The data 1702 may be provided from the preliminary storage by any entity capable of transacting data with a data storage system, such as over a network (including the Internet). Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 1704 via application programming interface calls, web service calls, or other programmatic methods), and the like.

The data storage system 1704 may be any computing resource or collection of such resources capable of processing data for storage, and interfacing with one or more resources to cause the storage of the processed data. Examples include physical computing systems (e.g., servers, desktop computers, laptop computers, thin clients, and handheld devices such as smartphones and tablets), virtual computing systems (e.g., as may be provided by the computing resource service provider using one or more resources associated therewith), services (e.g., such as those connecting to the data storage system 1704 via application programming interface calls, web service calls, or other programmatic methods), and the like. In some embodiments, the resources of the data storage system 1704, as well as the data storage system 1704 itself, may be one or more resources of a computing resource service provider, such as that described in further detail below. In some embodiments, the data storage system 1704 and/or the computing resource service provider provides one or more archival storage services and/or data storage services, such as those described herein, through which a client entity may provide data such as the data 1702 for storage in preliminary storage and/or the data storage system 1704.

Data 1702 may include any quantity of data in any format. For example, the data 1702 may be a single file or may include several files. The data 1702 may also be encrypted by, for example, a component of the data storage system 1704 after the receipt of the data 1702 in response to a request made by a customer of the data storage system 1704 and/or by a customer of computing resource service provider.

The data storage system 1704 may sort one or more identity shards according to one or more criteria (and in the case where a plurality of criteria is used for the sort, such criteria may be sorted against sequentially and in any order appropriate for the implementation). Such criteria may be attributes common to some or all of the archives, and may include the identity of the customer, the time of upload and/or receipt (by the data storage system 1704), archive size, expected volume and/or shard boundaries relative to the boundaries of the archives (e.g., so as to minimize the number of archives breaking across shards and/or volumes), and the like. As mentioned, such sorting may be performed so as to minimize the number of volumes on which any given archive is stored. Such techniques may be used, for example, to optimize storage in embodiments where the overhead of retrieving data from multiple volumes is greater than the benefit of parallelizing the retrieval from the multiple volumes. Information regarding the sort order may be persisted, for example, by the data storage system 1704, for use in techniques described in further detail herein.

As previously discussed, in some embodiments, one or more indices may be generated in connection with, for example, the order in which the archives are to be stored, as determined in connection with the sorting mentioned immediately above. The index may be a single index or may be a multipart index, and may be of any appropriate architecture and may be generated according to any appropriate method. For example, the index may be a bitmap index, dense index, sparse index, or a reverse index. Embodiments where multiple indices are used may implement different types of indices according to the properties of the identity shard to be stored via the data storage system 1704. For example, a data storage system 1704 may generate a dense index for archives over a specified size (as the size of the index itself may be small relative to the number of archives stored on a given volume), and may also generate a sparse index for archives under that specified size (as the ratio of index size to archive size increases).

The data storage system 1704 is connected to or includes one or more volumes 1706 on which archives or identity shards may be stored. The generated indices for the archives may also be stored on the one or more volumes 1706. The volumes 1706 may be any container, whether logical or physical, capable of storing or addressing data stored therein. In some embodiments, the volumes 1706 may map on a one-to-one basis with the data storage devices on which they reside (and, in some embodiments, may actually be the data storage devices themselves). In some embodiments, the size and/or quantity of the volumes 1706 may be independent of the capacity of the data storage devices on which they reside (e.g., a set of volumes may each be of a fixed size such that a second set of volumes may reside on the same data storage devices as the first set). The data storage devices may include any resource or collection of resources, such as those of a computing resource service provider, that are capable of storing data, and may be physical, virtual, or some combination of the two.

As previously described, one or more indices may, in some embodiments, be generated for each volume of the plurality of volumes 1706, and in such embodiments, may reflect the archives stored on the respective volume to which it applies. In embodiments where sparse indices are used, a sparse index for a given volume may point to a subset of archives stored or to be stored on that volume, such as those archives which may be determined to be stored on the volume based on the sort techniques mentioned previously. The subset of volumes to be indexed in the sparse index may be selected on any appropriate basis and for any appropriate interval. For example, the sparse index may identify the archives to be located at every x blocks or bytes of the volume (e.g., independently of the boundaries and/or quantity of the archives themselves). As another example, the sparse index may identify every nth archive to be stored on the volume. As may be contemplated, the indices (whether sparse or otherwise), may be determined prior to actually storing the archives on the respective volumes. In some embodiments, a space may be reserved on the volumes so as to generate and/or write the appropriate indices after the archives have been written to the volumes 1706.

In some embodiments, the sparse indices are used in connection with information relating to the sort order of the archives so as to locate archives without necessitating the use of dense indices, for example, those that account for every archive on a given volume. Such sort order-related information may reside on the volumes 1706 or, in some embodiments, on an entity separate from the volumes 1706, such as in a data store or other resource of a computing resource service provider. Similarly, the indices may be stored on the same volumes 1706 to which they apply, or, in some embodiments, separately from such volumes 1706.

The archives may be stored, bit for bit (e.g., the "original data" of the archives), on a subset of the plurality of volumes 1706. Also as mentioned, appropriate indices may also be stored on the applicable subset of the plurality of volumes 1706. The original data of the archives is stored as a plurality of shards across a plurality of volumes, the quantity of which (either shards or volumes, which in some cases may have a one to one relationship) may be predetermined according to various factors, including the number of total shards that may be used to reconstruct the original data using a redundancy encode. In some embodiments, the number of volumes used to store the original data of the archives is the quantity of shards that may be used to reconstruct the original data from a plurality of shards generated by a redundancy code from the original data. As an example, FIG. 17 illustrates five volumes, three of which contain original data archives 1708 and two of which contain derived data 1710, such as redundancy encoded data. In the illustrated example, the redundancy code used may require any three shards to regenerate original data, and therefore, a quantity of three volumes may be used to write the original data (even prior to any application of the redundancy code).

The volumes 1706 bearing the original data archives 1708 may each contain or be considered as shards unto themselves. For example, the data 1702 from preliminary storage may be copied directly only to a volume if, as described herein, it is stored in preliminary storage as an identity shard. In embodiments where the sort order-related information and/or the indices are stored on the applicable volumes 1706, they may be included with the original data of the archives and stored therewith as shards, as previously mentioned. In the illustrated example, the original data archives 1708 are stored as three shards (which may include the respective indices) on three associated volumes 1706. In some embodiments, the original data archives 1708 (and, in embodiments where the indices are stored on the volumes, the indices) are processed by an entity associated with, for example, the archival storage service, using a redundancy code, such as an erasure code, so as to generate the remaining shards, which contain encoded information rather than the original data of the original data archives. The original data archives 1708 may be processed using the redundancy code at any time after being sorted, such as prior to being stored on the volumes, contemporaneously with such storage, or after such storage.

Such encoded information may be any mathematically computed information derived from the original data, and depends on the specific redundancy code applied. As mentioned, the redundancy code may include erasure codes (such as online codes, Luby transform codes, raptor codes, parity codes, Reed-Solomon codes, Cauchy codes, Erasure Resilient Systematic Codes, regenerating codes, or maximum distance separable codes), or other forward error correction codes. In some embodiments, the redundancy code may implement a generator matrix that implements mathematical functions to generate multiple encoded objects correlated with the original data to which the redundancy code is applied. In some of such embodiments, an identity matrix is used, wherein no mathematical functions are applied and the original data (and, if applicable, the indices) are allowed to pass straight through. In such embodiments, it may be therefore contemplated that the volumes bearing the original data (and the indices) may correspond to objects encoded from that original data by the identity matrix rows of the generator matrix of the applied redundancy code, while volumes bearing derived data correspond to other rows of the generator matrix. In the example illustrated in FIG. 17, the five volumes 1706 include three volumes that have shards (e.g., identity shards) corresponding to the original data of the original data archives 1708, while two have encoded shards corresponding to the derived data 1710 (also referred to herein as "derived shards"). As illustrated in FIG. 17, the three original data archives 1708, and the two encoded shards corresponding to the derived data 1710 form a bundle 1718 (denoted by the dashed line). In this example, the applied redundancy code may result in the data being stored in a "3:5" scheme, wherein any three shards of the five stored shards are required to regenerate the original data, regardless of whether the selected three shards contain the original data or the derived data.

In some embodiments, if one of the volumes 1706 or a shard stored thereon is detected as corrupt, missing, or otherwise unavailable, a new shard may be generated using the redundancy code applied to generate the shard(s) in the first instance. The new shard may be stored on the same volume or a different volume, depending, for example, on whether the shard is unavailable for a reason other than the failure of the volume. The new shard may be generated by, for example, the data storage system 1704, by using a quantity of the remaining shards that may be used to regenerate the original data (and the index, if applicable) stored across all volumes, regenerating that original data, and either replacing the portion of the original data corresponding to that which was unavailable (in the case that the unavailable shard contains original data), or reapplying the redundancy code so as to provide derived data for the new shard.

As previously discussed, in some embodiments, the new shard may be a replication of the unavailable shard, such as may be the case if the unavailable shard includes original data of the archive(s). In some embodiments, the new shard may be selected from a set of potential shards as generated by, for example, a generator matrix associated with the redundancy code, so as to differ in content from the unavailable shard (such as may be the case if the unavailable shard was a shard generated from the redundancy code, and therefore contains no original data of the archives). As discussed throughout this disclosure, the shards and/or volumes may be grouped and/or layered.

In some embodiments, retrieval of an archive stored in accordance with the techniques described herein may be requested by a client entity under control of a customer of the computing resource service provider and/or the archival storage service provided therefrom, as described in further detail throughout this disclosure. In response to the request, the data storage system 1704 may locate, based on information regarding the sort order of the archives as stored on the volumes 1706, the specific volume on which the archive is located. Thereafter, the index or indices may be used to locate the specific archive, whereupon it may be read from the volume and provided to a requesting client entity. In embodiments where sparse indices are employed, the sort order information may be used to locate the nearest location (or archive) that is sequentially prior to the requested archive, whereupon the volume is sequentially read from that location or archive until the requested archive is found. In embodiments where multiple types of indices are employed, the data storage system 1704 may initially determine which of the indices includes the most efficient location information for the requested archive based on assessing the criteria used to deploy the multiple types of indices in the first instance. For example, if archives under a specific size are indexed in a sparse index and archives equal to or over that size are indexed in a parallel dense index, the data storage system 1704 may first determine the size of the requested archive, and if the requested archive is larger than or equal to the aforementioned size boundary, the dense index may be used so as to more quickly obtain the precise location of the requested archive.

In some embodiments, the volumes 1706 may be grouped such that each given volume has one or more cohorts 1716. In such embodiments, a volume set (e.g., all of the illustrated volumes 1706) may be implemented such that incoming archives to be stored on the volumes are apportioned to one or more failure-decorrelated subsets of the volume set. The failure-decorrelated subsets may be some combination of the volumes 1706 of the volume subset, where the quantity of volumes correlates to a number of shards required for the implemented redundancy code. In the illustrated example, the overall volume set may comprise two failure-decorrelated subsets (volumes in a horizontal row) where a given constituent volume is paired with a cohort (e.g., the cohort 1716). In some embodiments, the incoming archives are apportioned to one or more of the cohorts in the failure-decorrelated subset according to, for example, a predetermined sequence, based on one or more attributes of the incoming archives, and the like.

The illustrated example shows, for clarity, a pair-wise cohort scheme, though other schemes are contemplated as within scope of this disclosure, some of which are outlined in greater detail herein. In the illustrated example, some of the volumes of the volume set store original data of incoming archives (e.g., original data archives 1708 and/or original data archives 1712), while others store derived data (e.g., derived data 1710 and derived data 1714). The data storage system 1704 may implement a number of failure-decorrelated subsets to which to store the incoming archives, and in the pair-wise scheme pictured, the volumes used for a given archive may differ based on some arbitrary or predetermined pattern. As illustrated, some archives may be apportioned to volumes of a given cohort that are assigned to one pattern, or failure-decorrelated subset as shown by original data archives 1708 and derived data 1710, while others are apportioned to volumes in a different pattern as shown by original data archives 1712 and derived data 1714. The patterns, as mentioned, may be arbitrary, predefined, and/or in some cases, sensitive to attributes of the incoming data. In some embodiments, patterns may not be used at all, and the member volumes of a given failure-decorrelated subset may be selected randomly from a pool of volumes in the volume set.

Figure 18:
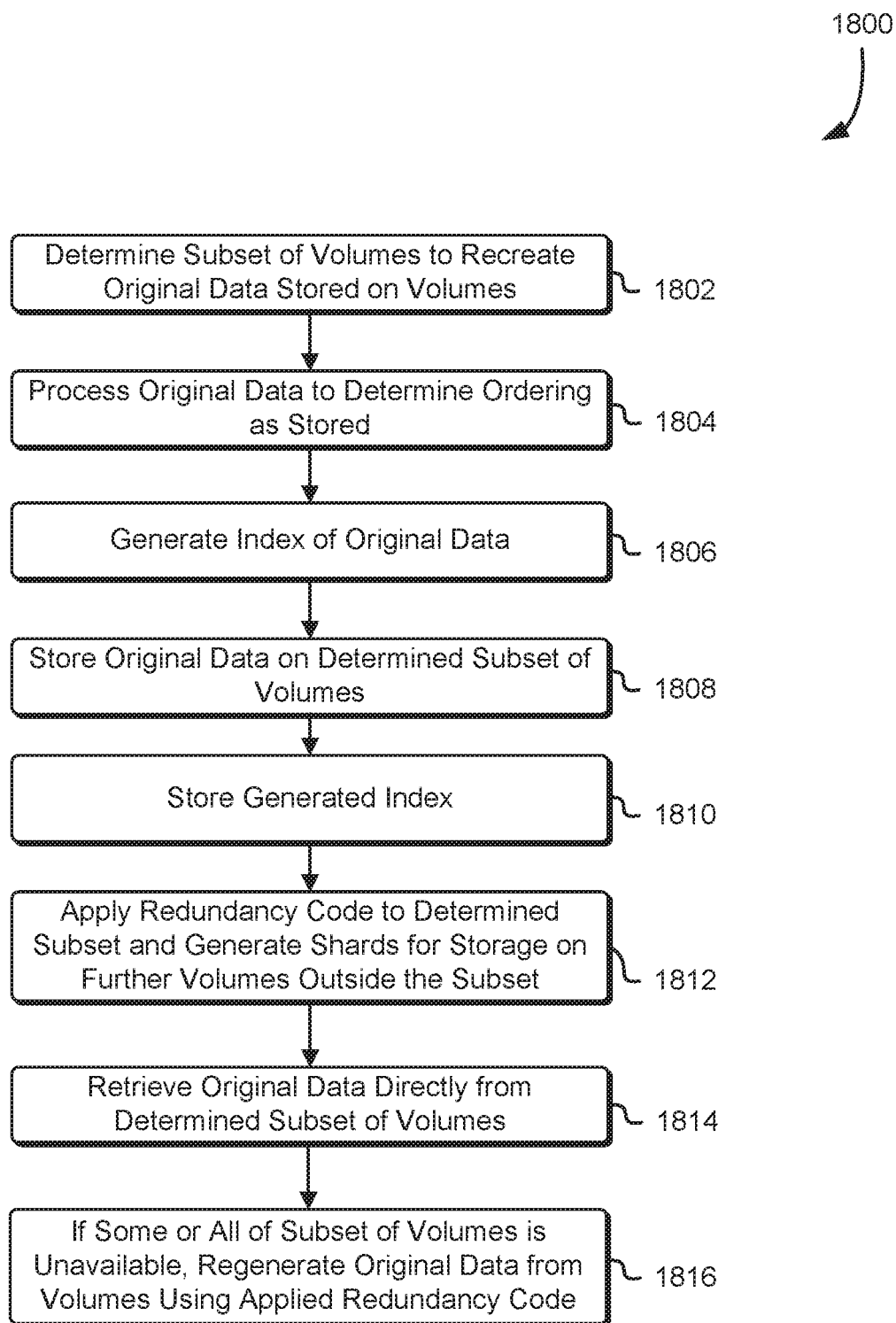
FIG. 18 illustrates an example process for applying redundancy encoding techniques to data stored in durable storage in accordance with at least one embodiment.

FIG. 18 illustrates an example process 1800 for applying redundancy encoding techniques to data stored in durable storage as described herein and in accordance with at least one embodiment. The example process 1800 illustrated in FIG. 18 illustrates the processing, indexing, storing, and retrieving of data stored on a data storage system. The data may be retrieved from preliminary storage as described herein. The example process 1800 illustrated in FIG. 18 may be used in conjunction with a grid encoding technique such that described in connection with FIG. 16, in conjunction with a bundle encoding technique such as that described in connection with FIG. 17, or with some other redundancy encoding technique. A data storage service may perform the example process 1800 illustrated in FIG. 18.

At step 1802, a resource of a data storage system, such as that implementing a redundancy code to store archives, determines which subset (e.g., quantity) of a plurality of volumes that may be used to recreate the original data to be stored, based on, for example, a redundancy code to be applied to the archives. For example, in accordance with the techniques described above in connection with FIG. 17, such information may be derived from predetermining the parameters of an erasure code with a specified ratio of shards that may be used to regenerate the original data from which they derive to the total number of shards generated from the application of the erasure code.

At step 1804, original data, such as original data of archives received from customers of, for example, a data storage system or a computing resource service provider as described in further detail herein, is sorted by, for example, the data storage system or associated entity. For example, the sort order may be implemented on one or more attributes of the incoming data.

At step 1806, one or more indices, such as sparse indices, are generated by, for example, the data storage system, for the original data. For example, there may be more than one index for a given volume, and such parallel indices may be of different types depending on the nature of the archives and/or original data being stored.

At step 1808, the original data is stored, for example, by the data storage system, on the subset of volumes determined in connection with step 1802, and in the order determined in step 1804. Additionally, at step 1810, the index generated in step 1806 is stored, for example, by the data storage system, on an appropriate entity. For example, the index may be stored as part of a shard on which the original data is stored, or, in some embodiments, may be stored on a separate resource from that which persists the volume.

At step 1812, the redundancy code is applied, for example, by the data storage system, to the determined subset of volumes (e.g., shards, as previously described herein), and additional shards containing data derived from the application of the redundancy code are stored on a predetermined quantity of volumes outside the subset determined in connection with step 1802. For example, the ratio of volumes (e.g., shards as previously described herein) storing the original data to the overall quantity of volumes (including those storing the derived data generated in this step 1812) may be prescribed by the recovery/encoding ratio of the redundancy code applied herein.

At step 1814, in normal operation, requested data may be retrieved, for example, by the data storage system, directly from the subset of volumes storing the original data, without necessitating retrieval and further processing (e.g., by the redundancy code) from the volumes storing the derived data generated in step 1812. However, at step 1816, if any of the volumes are determined, for example, by the data storage system, to be unavailable, a replacement shard may be generated by the data storage system by reconstructing the original data from a quorum of the remaining shards, and re-encoding using the redundancy code to generate the replacement shard. The replacement shard may be the same or may be different from the shard detected as unavailable.

Figure 19:
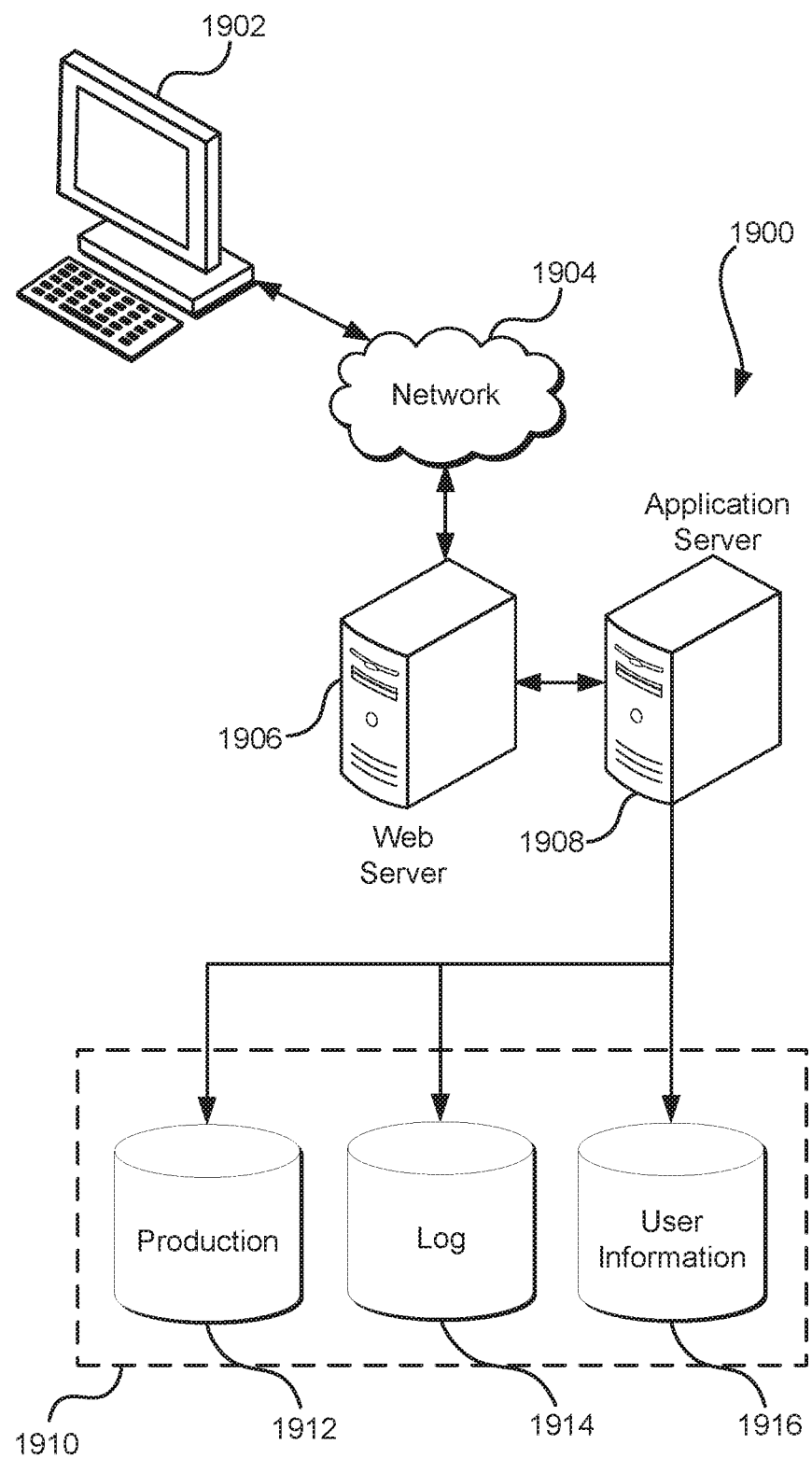
FIG. 19 illustrates an environment in which various embodiments can be implemented.

FIG. 19 illustrates aspects of an example environment 1900 for implementing aspects in accordance with various embodiments. As will be appreciated, although a web-based environment is used for purposes of explanation, different environments may be used, as appropriate, to implement various embodiments. The environment includes an electronic client device 1902, which can include any appropriate device operable to send and/or receive requests, messages, or information over an appropriate network 1904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1906 for receiving requests and serving content in response thereto, although for other networks an alternative device serving a similar purpose could be used as would be apparent to one of ordinary skill in the art.

The illustrative environment includes at least one application server 1908 and a data store 1910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1902 and the application server 1908, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1910 can include several separate data tables, databases, data documents, dynamic data storage schemes, and/or other data storage mechanisms and media for storing data relating to a particular aspect of the present disclosure. For example, the data store illustrated may include mechanisms for storing production data 1912 and user information 1916, which can be used to serve content for the production side. The data store also is shown to include a mechanism for storing log data 1914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1910. The data store 1910 is operable, through logic associated therewith, to receive instructions from the application server 1908 and obtain, update, or otherwise process data in response thereto. The application server 1908 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 19. Thus, the depiction of the system 1900 in FIG. 19 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a programmatic request to store a plurality of files on data storage of a data storage service, the data storage being configured with a file system, the programmatic request including a data container that includes an encoded form of the plurality of files;
   determining, based at least in part on a flag associated with the programmatic request, to validate the plurality of files of the data container and store the plurality of files individually;
   as a result of the determination, extracting the plurality of files from the encoded form in the data container;
   verifying one or more attributes associated with the plurality of files, the one or more attributes being associated with one or more conventions of the file system; and
   as a result of verifying the one or more attributes, storing the extracted plurality of files in the file system.

2. The computer-implemented method of claim 1, further comprising as a result of verifying that the one or more attributes are mismatched with the conventions, responding to the programmatic request with an exception.

3. The computer-implemented method of claim 1, wherein the conventions are at least partially defined by a policy associated with the data storage.

4. The computer-implemented method of claim 1, wherein the programmatic request is an API call.

5. A system, comprising:
   one or more processors; and
   memory to store executable instructions that, as a result of execution by the one or more processors, cause the system to at least:
   receive a request to store a plurality of files on data storage associated with a data storage service, the data storage being configured with one or more data storage conventions, the request including a data container that includes an encoded form of the plurality of files;

determine, based at least in part on a flag included with the data container, to validate the plurality of files in the data container and store the plurality of files as individual files;

process the data container so as to verify one or more attributes associated with the plurality of files in the data container, the one or more attributes being associated with the one or more data storage conventions; and as a result of verifying the one or more attributes, store the plurality of files on the data storage.

6. The system of claim 5, wherein the request is an API call.

7. The system of claim 5, wherein the request is submitted through a user interface.

8. The system of claim 5, wherein the plurality of files is stored on the data storage after being extracted from the data container.

9. The system of claim 5, wherein the one or more data storage conventions are defined in a policy associated with the data storage.

10. The system of claim 5, wherein the one more data storage conventions are associated with one or more conventions of a key-value store associated with the data storage.

11. The system of claim 5, wherein the instructions that, as a result of execution by the one or more processors, cause the system to process the data container at least by extracting the plurality of files from the data container.

12. The system of claim 5, wherein the data container is a compressed file.

13. A non-transitory computer-readable storage medium comprising stored thereon executable instructions that, as a result of being executed by one or more processors of a computer system, cause the computer system to at least:

process requests to store data on data storage associated with the computer system, the data storage of a data storage service being configured with a file system with one or more conventions, at least some of the requests being associated with a plurality of data containers, at least a subset of the plurality of data containers associated with a processing flag;

determine the subset of data containers associated with the processing flag, causing the data in the subset of data containers to be validated, wherein the processing flag indicates the data in the subset of data containers is to be stored as individual data objects;

verify one or more attributes associated with data in the subset of data containers, the one or more attributes being associated with the one or more data storage conventions; and as a result of verifying the one or more attributes, cause the data in the subset of the data containers to be stored in the file system.

14. The non-transitory computer-readable storage medium of claim 13, wherein at least some of the requests are generated via a user interface.

15. The non-transitory computer-readable storage medium of claim 13, wherein the file system is a hosted by a different computer system to which the computer system connects via a network.

16. The non-transitory computer-readable storage medium of claim 13, wherein the data includes files.

17. The non-transitory computer-readable storage medium of claim 16, wherein the one or more attributes include file name length.

18. The non-transitory computer-readable storage medium of claim 13, wherein outcomes of the requests are provided to a requestor via the computer system.

19. The non-transitory computer-readable storage medium of claim 13, wherein the executable instructions that cause the one or more attributes to be verified, when executed, further cause the computer system to first extract the data from the data containers.

20. The non-transitory computer-readable storage medium of claim 13, wherein at least some of the requests are web service calls.

* * * * *